United States Patent
Yamamiya

(10) Patent No.: US 7,972,738 B2
(45) Date of Patent: Jul. 5, 2011

(54) RESIDUAL CAPACITY DETECTION METHOD AND RESIDUAL CAPACITY DETECTION SYSTEM FOR FUEL CELL BATTERY

(75) Inventor: Kunio Yamamiya, Kanagawa (JP)

(73) Assignee: Olympus Imaging Corp. (JP)

( * ) Notice: Subject to any disclaimer, the term of this patent is extended or adjusted under 35 U.S.C. 154(b) by 945 days.

(21) Appl. No.: 11/866,010

(22) Filed: Oct. 2, 2007

(65) Prior Publication Data

US 2008/0176115 A1     Jul. 24, 2008

(30) Foreign Application Priority Data

Oct. 18, 2006  (JP) ................................ 2006-284197
Dec. 7, 2006   (JP) ................................ 2006-331124
Sep. 11, 2007  (JP) ................................ 2007-235514

(51) Int. Cl.
   *H01M 8/00*    (2006.01)
   *H01M 8/04*    (2006.01)
   *G03B 17/00*   (2006.01)
(52) U.S. Cl. .................... 429/433; 429/442; 429/444
(58) Field of Classification Search .................. 429/421, 429/433, 434, 442, 444, 515
   See application file for complete search history.

(56) References Cited

U.S. PATENT DOCUMENTS

| 5,976,725 A | 11/1999 | Gamo et al. |
| 7,442,451 B2 | 10/2008 | Sugihara |
| 2004/0142222 A1 * | 7/2004 | Yang et al. ...................... 429/26 |
| 2005/0280987 A1 | 12/2005 | Kwitek et al. |
| 2006/0243025 A1 * | 11/2006 | Cheng et al. .................. 73/23.2 |
| 2007/0031709 A1 * | 2/2007 | Hosoe ............................. 429/24 |

FOREIGN PATENT DOCUMENTS

| JP | 06-066787 | 3/1994 |
| JP | 2002-216782 | 8/2002 |
| JP | 2003333100 A * | 11/2003 |
| JP | 2004-241261 | 8/2004 |
| JP | 2004241261 A * | 8/2004 |
| JP | 2004-362786 | 12/2004 |
| JP | 2005-174774 | 6/2005 |
| JP | 2006-024028 | 1/2006 |
| JP | 2006-091399 | 4/2006 |
| JP | 2006-099984 | 4/2006 |
| JP | 2006-164872 | 6/2006 |
| JP | 2006-203997 | 8/2006 |
| JP | 2006-353094 | 12/2006 |

OTHER PUBLICATIONS

"Fuel Control Micro-Valve for Portable Fuel Cells," Matsushita Technical Journal, vol. 53, No. 4, 2005, only abstract considered.

* cited by examiner

*Primary Examiner* — Gregg Cantelmo
(74) *Attorney, Agent, or Firm* — Volpe and Koenig, P.C.

(57) ABSTRACT

Upon determining the temperature of and pressure in a flow path connecting between a fuel cell and a fuel storage container for supplying fuel to the fuel cell in order to detect a residual capacity of a fuel cell battery, the temperature is determined from those measured in electronic equipment connected to the fuel cell battery. Therefore, there can be provided a residual capacity detection method and a residual capacity detection system for a fuel cell battery, which can give a user accurate information on battery residual capacity even if there is no temperature detection part in a fuel cell system. The present invention can also be understood as a residual capacity detection system for a fuel cell battery.

6 Claims, 15 Drawing Sheets

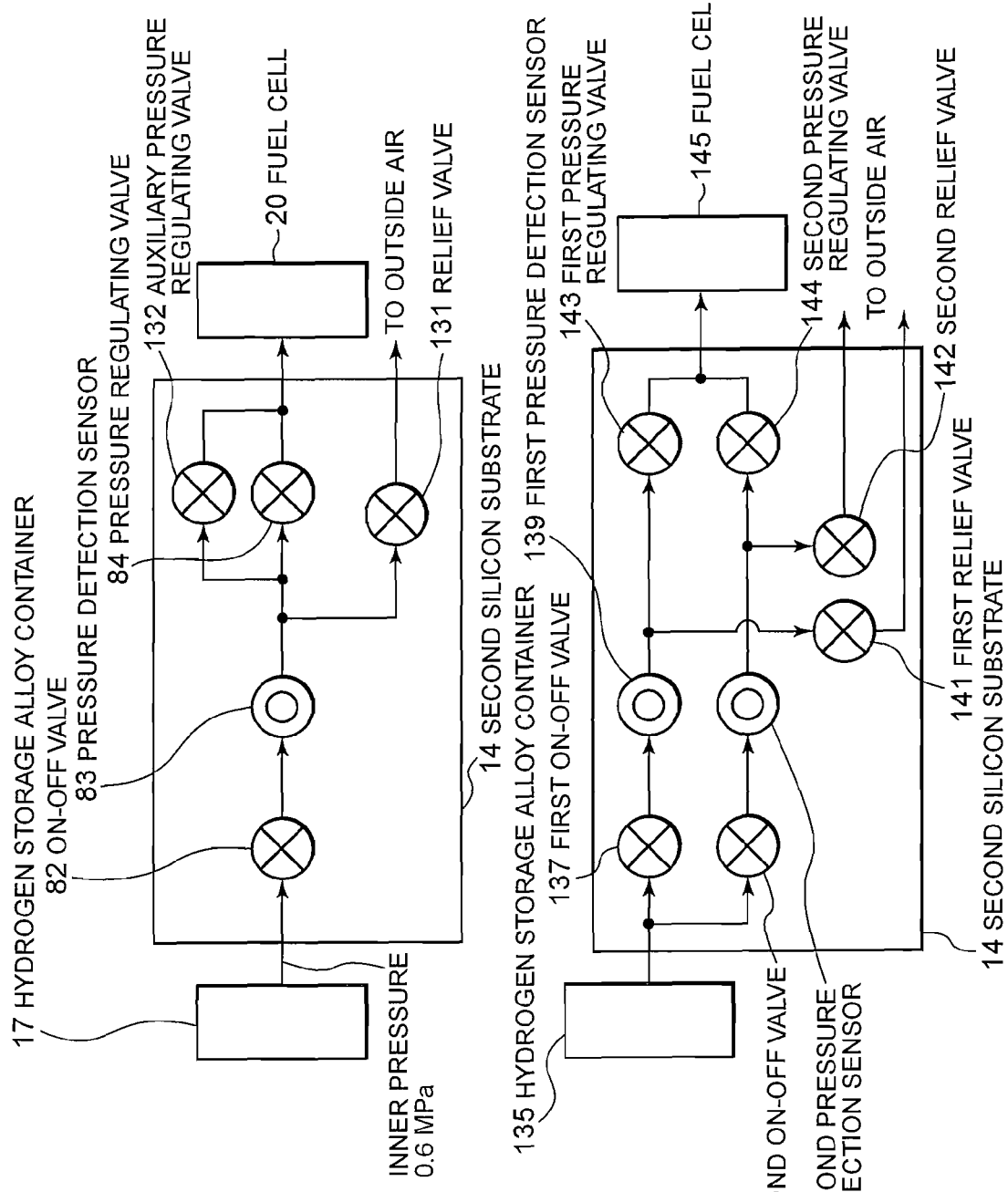

| NO. | MANUFACTURER NAME | TYPE OF HYDROGEN STORAGE ALLOY AND HYDROGEN STORAGE CAPACITY | NUMBER OF FLOW PATHS AND NUMBER OF RELIEF VALVES ON SILICON SUBSTRATE | DATE OF MANUFACTURE | LINE PRESSURE LIMIT | PRESSURE SENSOR SENSITIVITY | TEMPERATURE DIFFERENCE OF PRESSURE SENSOR FROM TEMPERATURE SENSOR AT 60°C | PRESENCE OF FIN | |
|---|---|---|---|---|---|---|---|---|---|
| 1 | COMPANY A | AB5 TYPE 1.0% PER MASS UNIT | ONE (ONE RELIEF VALVE) | 0000.00 | 0.46MPa | 0.05MPa/μ | 4°C (ROOM TEMPERATURE 56°C) | PRESENT | FIG. 10A |
| 2 | COMPANY A | AB5 TYPE 1.0% PER MASS UNIT | ONE (ONE RELIEF VALVE) | 0000.00 | 0.42MPa | 0.05MPa/μ | 8°C (ROOM TEMPERATURE 52°C) | NONE | FIG. 10A |
| 3 | COMPANY B | AB2 TYPE 1.5% PER MASS UNIT | TWO (TWO RELIEF VALVES) | 0000.00 | 0.47MPa | 0.03MPa/μ | 4°C (ROOM TEMPERATURE 56°C) | PRESENT | FIG. 10B |
| 4 | COMPANY B | AB2 TYPE 1.5% PER MASS UNIT | TWO (TWO RELIEF VALVES) | 0000.00 | 0.44MPa | 0.03MPa/μ | 8°C (ROOM TEMPERATURE 52°C) | NONE | FIG. 10B |
| 5 | COMPANY C | AB2 TYPE 1.5% PER MASS UNIT | TWO (ONE RELIEF VALVE) | 0000.00 | 0.44MPa | 0.03MPa/μ | 8°C (ROOM TEMPERATURE 52°C) | NONE | FIG. 10B |

FIG. 11A

| NO. | MANUFACTURER NAME | CAVITY PORTION TEMPERATURE (°C) | AMOUNT OF DISCHARGED HYDROGEN/TOTAL CONSUMPTION AMOUNT OF FUEL CELL BATTERY | PCT COEFFICIENT | FREQUENCY OF USE OF PRESSURE REGULATING VALVE | FREQUENCY OF USE OF RELIEF VALVE | CUMULATIVE TIME |
|---|---|---|---|---|---|---|---|
| 1 | COMPANY A | 20 | Q20 (T20) | PCT20 | 0 | 0 | 0h |
| 2 | COMPANY A | 23 | Q23 (T23) | PCT23 | 5 | 0 | 2h |
| 3 | COMPANY A | 27 | Q27 (T27) | PCT27 | 15 | 0 | 5h |
| 4 | COMPANY A | 32 | Q32 (T32) | PCT32 | 0 | 0 | 0h |
| 5 | COMPANY A | 35 | Q35 (T35) | PCT35 | 0 | 0 | 0h |
| 6 | COMPANY A | 40 | Q40 (T40) | PCT40 | 0 | 0 | 0h |
| 7 | COMPANY A | 45 | Q45 (T45) | PCT45 | 0 | 0 | 0h |
| 8 | COMPANY A | 53 OR MORE | Q53 (T45) | PCT53 | 0 | 1 | 0.02h |

FIG. 11B

RESIDUAL CAPACITY DETECTION METHOD AND RESIDUAL CAPACITY DETECTION SYSTEM FOR FUEL CELL BATTERY

CROSS-REFERENCE TO RELATED APPLICATION

This application is based upon and claims the benefit of priority from prior Japanese Patent Application Nos. 2006-284197, filed on Oct. 18, 2006; 2006-331124, filed on Dec. 7, 2006; and 2007-235514 filed on Sep. 11, 2007, the entire contents of which are incorporated herein by reference.

BACKGROUND OF THE INVENTION

1. Field of the Invention

The present invention relates to a residual capacity detection method and device for a fuel cell battery using hydrogen or the like as fuel.

2. Description of the Related Art

The application of fuel cell batteries using hydrogen or methanol can be considered as fuel cell batteries for various information processing apparatuses because of their light weight and convenience. As such information processing apparatuses, for example, there are digital cameras, camcorders, notebook-sized personal computers, cellular phones, personal digital assistants (PDAs), audio players, electronic devices having a communication function such as capsule-type medical devices, etc.

With a hydrogen storage container using a hydrogen storage material and a fuel cell system using the same, there is proposed a fuel cell system used especially for portable equipment.

For example, Japanese Patent Application Laid-Open No. 2004-362786 teaches a fuel cell system for portable equipment, in which an outgassing mechanism has a similar structure to a pressure control mechanism, and consists of a hydrogen relief valve using a piezoelectric substance and a flow path. This system has a primary pressure sensing mechanism for sensing hydrogen pressure in a hydrogen storage alloy container, and a pressure control circuit for controlling the action of the hydrogen relief valve using the piezoelectric element. In this structure, when the hydrogen pressure in or temperature of a hydrogen storage container exceeds a prescribed value, the pressure control circuit applies voltage to the hydrogen relief valve of piezoelectric substance to discharge hydrogen gas to the outside in order to assure that the discharge of the hydrogen gas is safe.

Further, Japanese Patent Application Laid-Open No. 2006-99984 discloses electronic equipment having a tank part in which a plurality of hydrogen storage alloys different in hydrogen desorption properties are housed. In this tank part, the hydrogen storage alloys, a pressure sensor, an output circuit, and a temperature sensor are included. This is electronic equipment using a fuel cell battery having a power generation part for generating electric power using hydrogen discharged from the tank part, a pressure detection part for detecting the pressure of hydrogen supplied to the power generation part, and a residual amount sensing part for detecting the residual amount of hydrogen based on the hydrogen desorption properties of the plurality of hydrogen storage alloys by means of the pressure detection part.

Further, Japanese Patent Application Laid-Open No. 2004-241261 describes a fuel cell battery having a temperature sensor for measuring the temperature of a hydrogen storage alloy in a hydrogen storage alloy tank in which the hydrogen storage alloy of the fuel cell battery is housed, a hydrogen flow path for supplying hydrogen from the hydrogen storage alloy tank to the fuel cell battery, and a pressure sensor for measuring hydrogen pressure in the hydrogen flow path. In this publication, a measurement method for determining the hydrogen storage capacity of the hydrogen storage alloy as a function representing a relationship between hydrogen pressure and residual hydrogen amount at each temperature predetermined in experiments is disclosed in connection with a graph representing the function.

Further, in "Fuel Control Micro-Valve for Portable Fuel Cells," *Matsushita Technical Journal*, Vol. 53 No. 4, there is disclosed such a technique that MEMS (Micro Electro Mechanical Systems) technology and an electrostatic drive system are used for a micro-valve to achieve a normally closed state as a fuel control valve for portable fuel cells to limit power consumption only during electric power generation.

BRIEF SUMMARY OF THE INVENTION

The residual capacity detection method for a fuel cell battery of the present invention is configured such that, upon determining the temperature of and pressure in a flow path connecting between a fuel cell and a fuel storage container for supplying fuel to the fuel cell in order to detect a residual capacity of the fuel cell battery, the temperatures are determined from those measured in electronic equipment connected to the fuel cell battery.

The residual capacity detection method for a fuel cell battery according to the present invention can be expressed as a residual capacity detection method for a fuel cell battery connected to electronic equipment and having a fuel cell, a fuel storage container for supplying fuel to the fuel cell, and a flow path connecting between the fuel cell and the fuel storage container, the method comprising: detecting temperature at a predetermined portion of the electronic equipment connected to the fuel cell battery; detecting pressure in the flow path; reading a temperature difference between the temperature of the electronic equipment and the temperature of the flow path from prestored reference data; determining the temperature of the flow path based on the temperature difference; and determining a residual capacity of the fuel cell battery from the temperature of the flow path and the pressure in the flow path.

The present invention can also be understood as a residual capacity detection system for a fuel cell battery.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 10A and FIG. 10B contain block diagrams A and B showing two types of fuel cell systems according to the first embodiment of the present invention;

FIGS. 11A and 11B are tables representing data items stored in ROM;

DETAILED DESCRIPTION OF THE PREFERRED EMBODIMENT

Preferred embodiments of the invention are described below with reference to the accompanying drawings.

First Embodiment

Figure 1A:
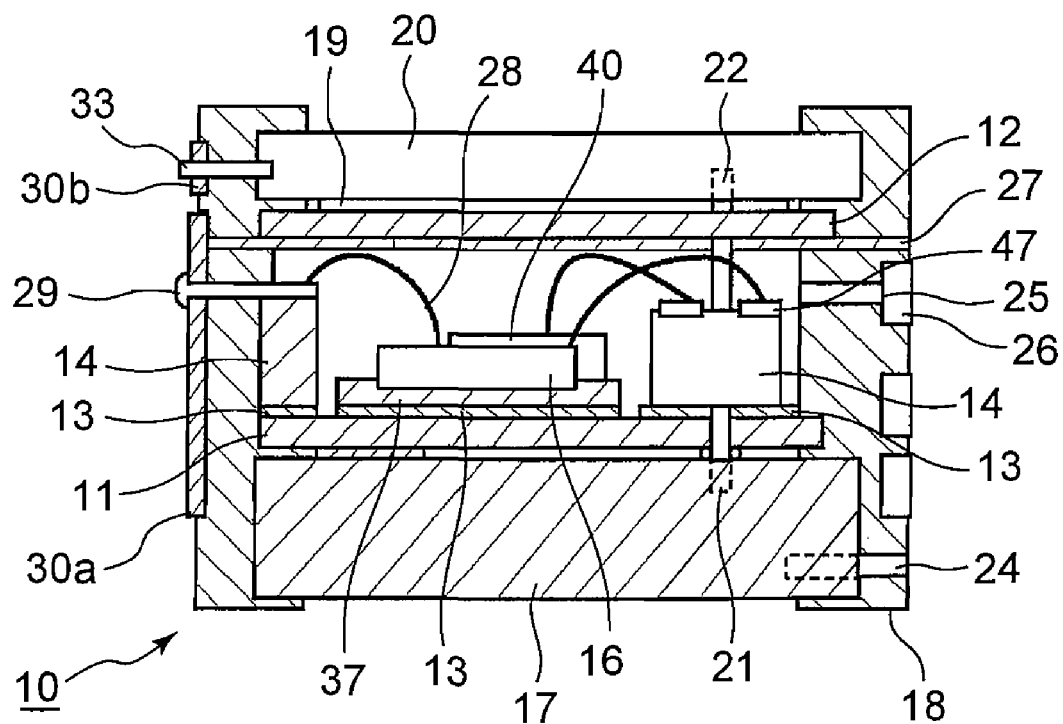
FIG. 1A is a sectional view showing the structure of a fuel cell system according to a first embodiment of the present invention.

FIG. 1A is a sectional view showing the structure of a fuel cell system according to a first embodiment of the present invention.

In FIG. 1A, a fuel cell system 10 includes a hydrogen storage alloy container housing 18 and a fuel cell unit 20 mounting in the hydrogen storage alloy container housing 18. In the hydrogen storage alloy container housing 18, a hydrogen storage alloy container 17, a first glass substrate 11, and a second glass substrate 12 are mounted. The first glass substrate 11 and the second glass substrate 12 reside between the fuel cell unit 20 and the hydrogen storage alloy container 17.

A first silicon substrate 13 and a third silicon substrate 37 are arranged on the first glass substrate 11. An IC chip (DRV-HAIC) 16 for drive circuit/amplitude amplification circuit is embedded in the third silicon substrate 37. On the other hand, a second silicon substrate 14 is arranged on the first silicon substrate 13. A piping A 21 extending into the hydrogen storage alloy container 17 through the first glass substrate 11, piping B 22 extending into the fuel cell unit 20 through the second glass substrate 12 and a heat insulating member 19 are provided in the second silicon substrate 14. These piping A 21 and piping B 22 form inlet and outlet of a hydrogen flow path (micro fluid flow path) for supplying hydrogen from the hydrogen storage alloy container 17 to the fuel cell unit 20.

Thus, the upper layer (piping B 22) and the lower layer (piping A 21) of the hydrogen flow path for supplying hydrogen to the fuel cell unit 20 are provided in the hydrogen storage alloy container housing 18. A pressure control mechanism having a function for adjusting hydrogen pressure to a balanced pressure or lower in a hydrogen storage alloy upon supplying hydrogen is formed on the second silicon substrate 14 for the piping B 22. The pressure control mechanism is composed, for example, of an on-off valve, a pressure detection sensor, a relief valve, and a pressure regulating valve provided on the second silicon substrate 14 or 183 shown in FIG. 10 or 14. Further, the piping A 21 is connected to the first silicon substrate 13 formed on the first glass substrate 11. Through-holes through which lead wires pass are formed at the bottom of the third silicon substrate 37. The lead wires include drive wires for the on-off valve and the relief valve and a signal line for the pressure detection sensor.

When a narrow piping (capillary) is arranged between the hydrogen storage alloy container housing 18 and the on-off valve, since pressure upon driving the pressure regulating valve drops due to pressure loss caused by the passage of hydrogen, the load on the pressure control mechanism can also be reduced.

Thus, the hydrogen storage alloy container housing 18 is combined with the fuel cell unit 20 to form the fuel cell system 10 in which the path from the hydrogen storage alloy container 17 to the fuel cell unit 20 is integrated.

The second glass substrate 12 is bonded on a retainer plate 27 made of a synthetic resin to locate it in parallel to the first glass substrate 11 in order to prevent electrostatic breakage of each of the fluidic devices such as the pressure sensor and the pressure regulating valve placed in a space between the second glass substrate 12 and the first glass substrate 11. Further, this synthetic resin retainer plate 27 is laminate-bonded between one fragmented part of the hydrogen storage alloy container housing 18 on the fuel cell unit 20 side and the other part of the hydrogen storage alloy container housing 18 on the hydrogen storage alloy container 17 side. Therefore, the synthetic resin retainer 27 thermally insulates the hydrogen storage alloy container housing 18 on the fuel cell unit 20 side from the hydrogen storage alloy container housing 18 supporting the hydrogen storage alloy container 17. In other words, since heat generated from the fuel cell unit 20 is inhibited from being transferred to the hydrogen storage alloy container 17, an abrupt temperature rise in the hydrogen storage alloy container 17 can be suppressed.

The fuel cell unit 20 consists of an anode plate, a cathode plate, and a solid polymer electrolyte membrane. The fuel cell unit 20 uses hydrogen as fuel to supply electric power. The heat insulating member 19 located underneath the fuel cell unit 20 is made up by packaging a core made of conductive powder in a non-woven bag and incrusting it. According to another embodiment, the heat insulating member 19 and the second glass substrate 12 can be replaced with a sheet of latent heat storage material of a thermo memory located opposite to the fuel cell unit 20 to store/hold a specific temperature.

The latent heat storage materials for storing temperature of heat generation (e.g., 58 degrees C.) include wax as an organic material and sodium acetate hydrate as an inorganic material.

The organic system takes the form of a microcapsule using a synthetic resin coating in which the latent heat storage material and high thermal-conductivity carbon fiber are filled and encapsulated. Such a vast number of microcapsules are bonded on the surface of a synthetic resin as a base plate material through a high thermal-conductivity adhesive agent to form a sheet material. This sheet material can be fixed on the second glass substrate or directly on the fuel cell unit with a high thermal-conductivity adhesive material.

When the temperature of the outer surface of the fuel cell unit 20 rises up to about 48 degrees C., the time of rising temperature in excess of 48 degrees C. is prolonged to temporarily store/hold heat caused when a heat storage material (diaphragm) 43 starts melting due to a phase change, making it possible to prevent a temperature rise in the hydrogen storage alloy container 17 due to the application of heat.

Thus, the latent heat temporarily stored in the latent heat storage material is gradually transferred. If the heat insulating member 19 in the form of a sheet of latent heat storage material is brought in close contact with the second glass substrate 12, the temporarily stored latent heat is gradually released from the sheet of latent heat storage material into interstitial spaces to perform air cooling. If the second glass substrate 12 is replaced with a heat radiation member made of such as a high thermal-conductivity aluminum material, the temporarily stored latent heat is gradually transferred from the aluminum material to the hydrogen storage alloy container 17.

The second glass substrate 12 is in close contact with the fuel cell unit 20 through the heat insulating member 19 as a crusted vacuum insulation material. Thus, since the heat insulating member 19 resides between the fuel cell unit 20 and the second glass substrate 12, heat generated from the fuel cell unit 20 can be insulated. If this vacuum insulation material is used, since the thickness of the heat insulating member 19 is several millimeters, it is preferable that the heat insulating member 19 be bonded directly to the hydrogen storage alloy container housing 18 to support the heat insulating member 19 without using the second glass substrate 12.

Further, a hydrogen supply port 24 is provided in the hydrogen storage alloy container 17 and the hydrogen storage alloy container housing 18. This hydrogen supply port 24 is removable and has a mechanism for opening a valve by connecting it to a hydrogen tank. Then, when the hydrogen tank is connected to the hydrogen supply port 24 to inject hydrogen, hydrogen is supplied and stored in the hydrogen storage alloy in the hydrogen storage alloy container 17. As examples of the hydrogen tank, there are hydrogen generators generating hydrogen as a result of interaction between a methanol, ethanol, or dimethyl ether and a porous material.

The hydrogen storage alloy container 17 has such a rectangular parallelepiped shape that the length thereof in the thickness direction is shorter than those in the other directions. The fuel cell unit 20 is arranged above the hydrogen storage alloy container 17. The hydrogen storage alloy container housing 18 having a rectangular shape is fabricated of a metal material, such as aluminum or stainless steel, capable of withstanding the pressure of the hydrogen storage alloy container 17. In case of use of aluminum as the material, the outer surface of the hydrogen storage alloy container housing 18 is processed such as to form many grooves thereon in order to form a plurality of cooling fins 26 having an uneven surface pattern in a direction perpendicular to the paper surface of FIG. 1.

Further, an air aspiration port 25 is inserted between the first glass substrate 11 and the second glass substrate 12. The air aspiration port 25 is formed by providing an opening in a groove portion of one of the fins 26 on a side opposite to the side where terminal substrates 30a, 30b of the hydrogen storage alloy container housing 18 are mounted (see FIG. 3). In such a layout, air aspiration is not affected by a plate spring member (not shown) for pressing a terminal on the equipment side onto a terminal of the terminal substrate 30a upon inserting the fuel cell system 10 into the equipment such as a cellular phone.

Pin terminals 29, 33 are coupled to the terminal substrates 30a, 30b, respectively. The pin terminal 33 is used for output voltage of the fuel cell unit 20. Further, the pin terminal 29, the DRV-HAIC 16, and a junction terminal substrate 47 are connected by bonding wires 28.

Figure 1B:
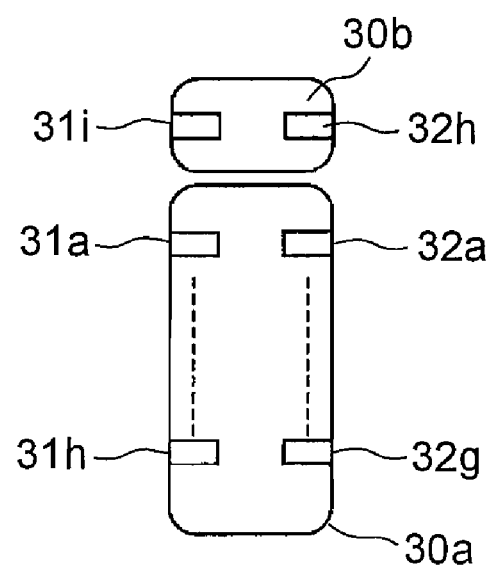
FIG. 1B is an illustration showing an example of terminal arrangement on terminal substrates 30a and 30b shown in FIG. 1A.

As shown in FIG. 1B, terminals of signal lines 31a to 31h for transmission from the pressure detection sensor and the pressure regulating valve to a control circuit, and terminals of drive wires 32a to 32g for electric power supply from the fuel cell 20 side to a device load part or a secondary battery and to the relief valve, the pressure detection sensor, and the pressure regulating valve are provided on the terminal substrate 30a. Further, a terminal 32h for a drive wire supplying electric power from the fuel cell 20 side to the device load part or the secondary battery and a ground terminal (GND) 31i are provided on the terminal substrate 30b.

Thus, since two pairs of different drive wires for electric power supply are arranged on the same terminal substrate, respectively, the total wiring length in the fuel cell system can be reduced. This makes it possible to reduce the number of man-hours for assembling and simplify the fuel cell system.

The equilibrium pressure of a hydrogen storage alloy also varies depending on the temperature of the hydrogen storage alloy in such a manner that the equilibrium pressure increases as the temperature increases. For example, in case of use of an AB5-type hydrogen storage alloy based on LaNi5, it is desirable that the equilibrium pressure be equal to or more than a normal pressure at 0 degree C., 0.6 MPa at 45 degrees C., and less than 1.0 MPa at 60 degrees C. on the assumption that the use environment falls within a temperature range between about 0 to 45 degrees C. It is therefore preferable to use a hydrogen storage alloy material having an equilibrium pressure of 0.25 to 0.35 MPa at 20 degrees C.

Figure 2:
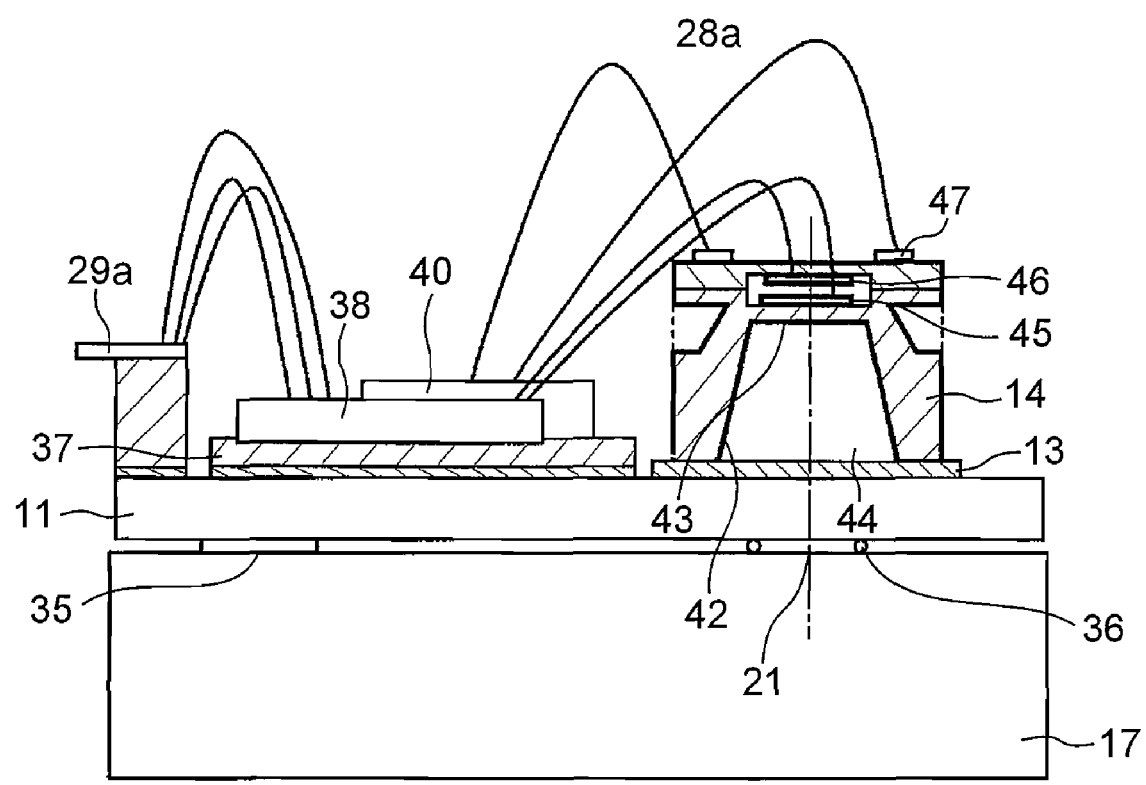
FIG. 2 is a sectional view showing a detailed structure of a pressure control mechanism in a fuel cell system 10 shown in FIG. 1A.

The pressure control mechanism is formed between the first glass substrate 11 and the second glass substrate 12. FIG. 2 is a sectional view showing the detailed structure of the pressure control mechanism of the fuel cell system 10 shown in FIG. 1A.

In FIG. 2, the first glass substrate 11 is arranged above the hydrogen storage alloy container 17 through an inclination adjusting member 35 and O rings (a packing material) 36. Then, the second silicon substrate 14 and the third silicon substrate 37 are arranged on the first silicon substrate 13.

A movable-side drive electrode plate 45 joined to the diaphragm 43 is provided in an upper position of the second silicon substrate 14. Further, the junction terminal substrate 47 is provided on the second silicon substrate 14, and a fixed-side drive electrode plate 46 is provided in such a manner to be connected to the junction terminal substrate 47. The moving-side drive electrode plate 45 and the fixed-side drive electrode plate 46 are paired and arranged opposite to each other to function as the pressure detection sensor for detecting pressure variations resulting from capacitance variations. In this case, through not shown, it is preferable that two pairs of drive electrode plates be arranged.

A cavity portion 44 exists in the second silicon substrate 14 between the first silicon substrate 13 with flow path on its bottom side and the pressure detection sensor. A protective coat 42 is formed on the interior surface of this cavity portion 44 to prevent the second silicon substrate 14 from being subject to corrosion from gas or the like.

On the other hand, an IC chip (DRV-HAIC) 38 for a sinusoidal voltage circuit 40 using a crystal oscillator and a drive circuit/amplified amplitude detection circuit is connected to the upper surface of the third silicon substrate 37.

Thus, the DRV-HAIC chip 38, the junction terminal substrate, and the plurality of pin terminals are connected by a bonding wire group 28a (bonding wires 28). For example, the upper side of the third silicon substrate 37 and the plurality of pin terminals 29a are connected by a part of the bonding wire group 28a.

Figure 3:
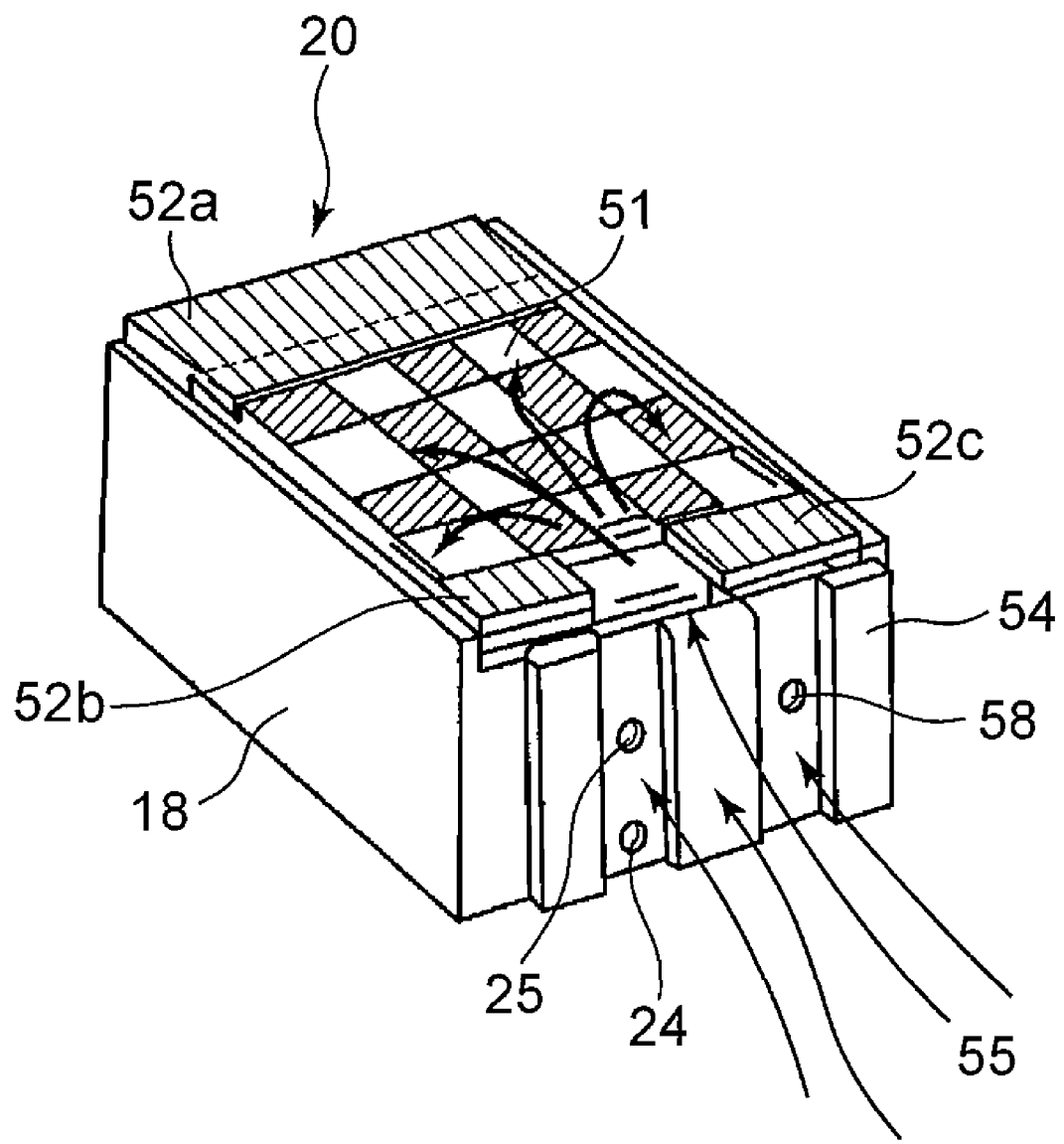
FIG. 3 is an exterior perspective view showing an exterior perspective view a fuel cell unit 20 and the hydrogen storage alloy container housing 18 are connected and assembled together.

FIG. 3 is an exterior perspective view showing an example in which the above-mentioned fuel cell unit 20 and the hydrogen storage alloy container housing 18 are connected and assembled together. The hydrogen storage alloy container housing 18 and the fuel cell unit 20 are joined together to form the main body of this fuel cell system 10.

The fuel cell system 10 is made up such that both ends of the unit are sealed with a seal material, such as a synthetic resin or rubber material, and its outer shape is rectangular. Further, a plurality of projection portions are formed on the top.

A recessed portion for housing the fuel cell unit 20 is formed on the top of the hydrogen storage alloy container housing 18 along the longitudinal direction of the fuel cell unit 20. The bottom face of the recessed portion corresponds to the upper surface of the heat insulating member 19 or the upper surface of the second glass substrate 12. Thus, in the fuel cell system 10 of the embodiment, the recessed portion is provided on the top of the hydrogen storage alloy container housing 18. In this structure, the fuel cell unit 20 is inserted into this recessed portion, and the synthetic resin portions formed on both sides of the fuel cell unit 20 are press-fitted and combined with machine screws or an adhesive agent, not shown. At this time, the plurality of projection portions are exposed on the top of the fuel cell unit 20. Thus, the projection portions are formed on the fuel cell unit 20 to make the assembly easy.

The fuel cell unit 20 is mounted in the hydrogen storage alloy container housing 18 and sealed with a UV cure adhesive, not shown. In this state, a cathode covered with stainless steel with a plurality of vent holes 51 provided therein is exposed on the top of the fuel cell unit 20. Further, the plurality of projection portions 52a, 52b, and 52c are provided on the top of the fuel cell unit 20.

An air inlet 55 is provided between the projection portions 52b and 52c on the front side in FIG. 3 as an opening for allowing air to pass through. This air inlet 55 is an air space to allow air to flow through when the fuel cell unit 20 is loaded in a battery compartment of a cellular phone, for example. In this case, when the fuel cell system 10 is loaded in the battery compartment (not shown), the air inlet 55 on the fuel cell system side is spaced a desired distance apart from a battery lid (not shown) of the cellular phone to which, for example, a maltprene sponge is attached. Air aspirated through the maltprene sponge of the battery lid and passed through the air inlet 55 is drawn into the plurality of vent holes 51.

The fuel cell system 10 is designed not to increase/decrease the amount of applied pressure caused by the contact pressure between the projection portions of the fuel cell system 10 and a guide faces of the inner surface of the battery compartment upon loading the fuel cell system 10 into the battery compartment.

A plurality of cooling fins 54 formed with an uneven strip pattern in the vertical direction on the paper surface of FIG. 3 are provided on the front face of the fuel cell system 10 in such a manner that the edge of a raised portion of one of the cooling fins 54 intersecting with the air inlet 55 is chamfered with a radius of curvature between about 0.3 and 1 mm. Further, the edges of the projection portions 52b, 52c located on both sides of the opening portion are chamfered (with a radius of curvature between about 0.3 and 1 mm) as well. Thus, as shown in FIG. 3, the projection portions 52b, 52c adjacent to the air inlet 55 and the raised portion of one of the cooling fins 54 are chamfered, thereby making it possible to reduce swirling flow effects (cavitation) on the exit side of the air inlet 55 into which air has flown.

Further, the air aspiration port 25, a hydrogen outlet 58, and the hydrogen supply port 24 are provided in the recessed portions of the cooling fins 54. Here, as shown in FIGS. 1 and 3, the fuel cell system 10 in which the fuel cell unit 20 and the hydrogen storage alloy container 17 are integrated in the hydrogen storage alloy container housing 18. However, a connector for connection to the piping A 21 can be provided for the purpose of loading only the hydrogen storage alloy container in the battery compartment of the electronic equipment.

Figure 4A:
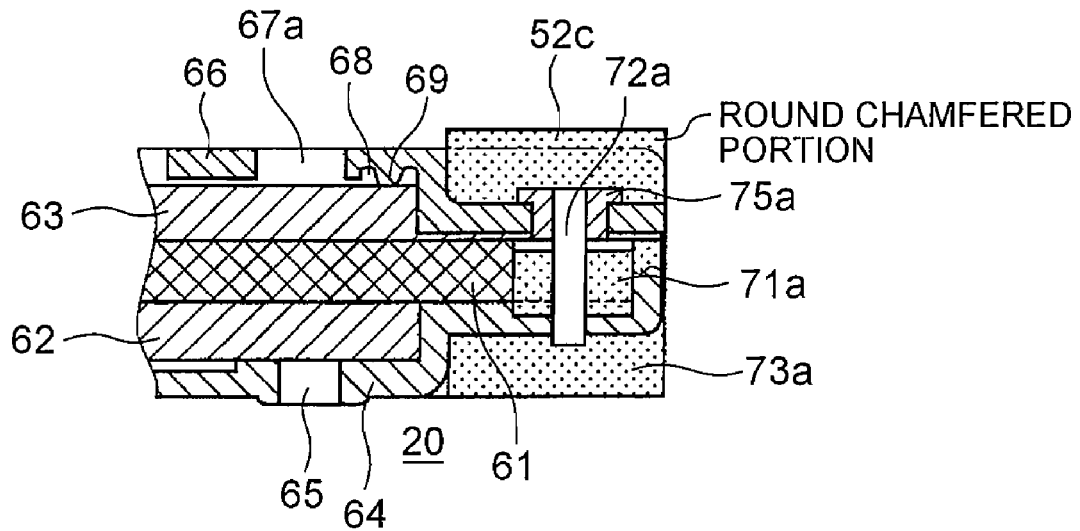
FIG. 4A is a sectional view showing one end of the fuel cell unit.
Figure 4B:
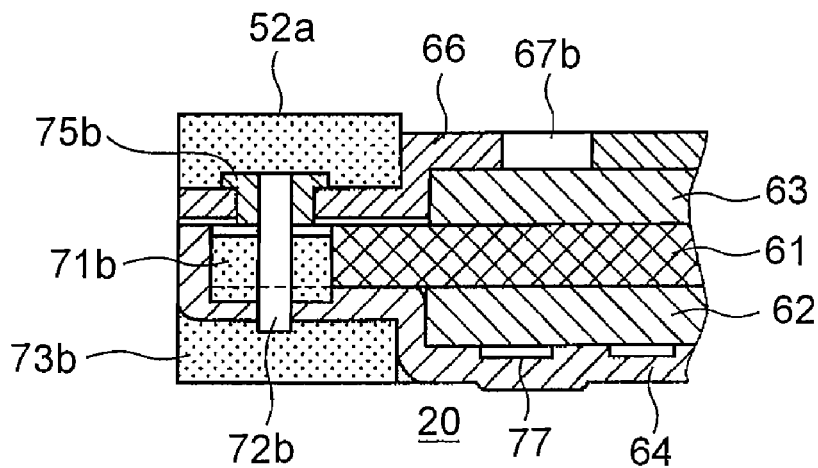
FIG. 4B is a sectional view showing the other end of the fuel cell unit.

FIGS. 4A and 4B are sectional views showing the structure of the fuel cell unit 20, where FIG. 4A is a sectional view in the vicinity of one end portion and FIG. 4B is a sectional view in the vicinity of the other end portion.

The fuel cell unit 20 includes a solid polymer electrolyte membrane 61, an anode plate 62, a first metal plate 64, a cathode plate 63, and a second metal plate 66. The solid polymer electrolyte membrane 61 is a plate material, for example, of about 75 to 100 μm thick. The first metal plate 64 is a stainless steel plate, for example, of about 0.5 to 1 mm thick. The second metal plate 66 is a magnetic material, for example, of about 0.5 to 1 mm thick, and a plurality of vent holes (air aspiration port 67a) are formed by etching.

A film magnetic layer 71a magnetized in the thickness direction is bonded in a clearance gap (space) between the solid polymer electrolyte membrane 61 arranged on the first metal plate 64 and the inner side wall of the first metal plate 64. The film magnetic layer 71a has a film layer of a rare-earth magnet such as SmCo, and this film magnetic layer 71a and the first metal plate 64 are bonded with a UV cure adhesive.

A hydrogen injection port 65 is formed in the first metal plate 64, and a plurality of locating pins 72a are provided. Then, the anode plate 62, the solid polymer electrolyte membrane 61, and the cathode plate 63 are laminated. A Bush 75a made of an insulating material is embedded in the second metal plate 66. The fuel cell unit 20 is bonded with the UV cure adhesive in the hydrogen storage alloy container housing 18 in such a manner that the hydrogen injection port 65 aligns with the hole position of the exposed piping B 22.

In the assembly of the fuel cell unit 20, the second metal plate 66 is assembled to the laminated structure of the anode plate 62, the solid polymer electrolyte membrane 61, and the cathode plate 63. At this time, when the bush 75a of the second metal plate 66 is inserted onto the locating pins 72a, the first metal plate 64 and the second metal plate 66 are coupled by the magnetic attractive force of the film magnetic layer 71a. As a result, the laminated structure of the anode plate 62, the solid polymer electrolyte membrane 61, and the cathode plate 63 is pressed from both the first metal plate 64 side and the second metal plate 66 side.

Therefore, if an appropriate magnetic attractive force of the film magnetic layer 71a is selected to adjust the amounts of pressure applied between the solid polymer electrolyte membrane 61 and the anode plate 62, and the cathode plate 63 in the laminated structure of the solid polymer electrolyte membrane 61, the anode plate 62, and the cathode plate 63, the first and second metal plates 64, 65 can be integrated into a unitary assembly.

Further, in the embodiment, a plurality of slotting portions 68 having a bending moment and a plurality of pressing portions 69 for pressing the cathode plate 63 are provided in the second metal plate 66. Thus, the pressing portions 69 partially provided in the second metal plate 66 form a secondarily fabricated surface to be brought into uniform contact with the periphery of the cathode plate 63. This structure can maintain the flatness.

FIG. 4B shows the vicinity of the other end portion of the above-mentioned fuel cell unit shown in FIG. 4A. The structure of the other end portion has substantially the same shape as the structure of the fuel cell unit 20 shown in FIG. 4A. Therefore, the same elements as those in FIG. 4A are given the same reference numerals except that the suffix "a" is changed to "b" to omit redundant description. Note further that in FIG. 4B the projection portions 54a on the top lie over the entire surface in the width direction without the stepped portion to form the air inlet.

In the embodiment, a plurality of locating pins are vertically provided on the hydrogen storage alloy container housing 18, and a plurality of fitting holes are provided in the first metal plate 64 inside the fuel cell unit 20 or the synthetic resin portion. After the fitting holes provided inside the fuel cell unit are inserted onto the locating pins provided vertically in the hydrogen storage alloy container housing 18, the hydrogen storage alloy container housing 18 and the fuel cell unit 20 are bonded with an UV cure adhesive, thereby making possible accurate alignment therebetween.

Figure 5A:
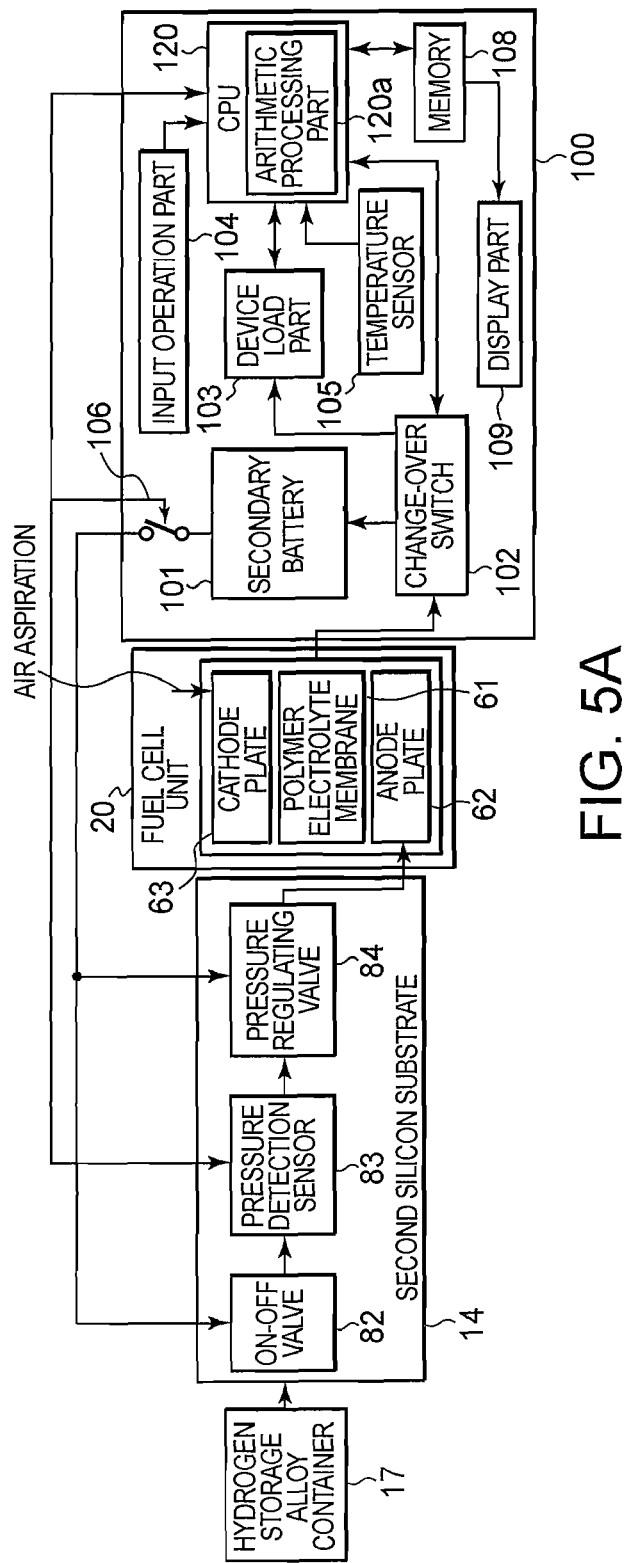
FIG. 5A and FIG. 5B contain block diagrams showing a combination of the fuel cell system and a residual capacity indicator displayed on electronic equipment incorporating therein a secondary battery and a CPU.
Figure 5B:
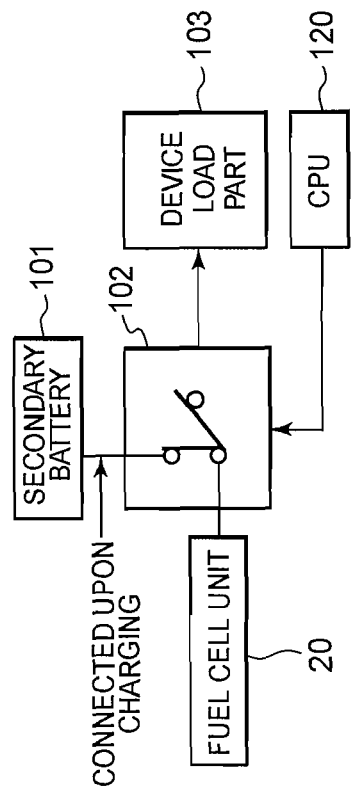

Referring next to FIGS. 5A and 5B, a combination of the fuel cell system and a residual capacity indicator displayed on electronic equipment with a secondary battery and a CPU incorporated therein will be described.

The hydrogen storage alloy container housing 18 includes the hydrogen storage alloy container 17, an on-off valve 82 arranged on the second silicon substrate 14, a pressure detection sensor 83, and a pressure regulating valve 84. The fuel cell unit 20 includes the anode plate 62, the cathode plate 63, and the solid polymer electrolyte membrane 61.

Potable electronic equipment (e.g., a cradle for digital cameras) 100 includes a CPU 120, a secondary battery charger (secondary battery) 101, a device load part 103, a change-over switch 102, a memory (storage means) 108, a display part 109, an input operation part 104, a temperature sensor 105 as a temperature detection part, and a battery compartment (not shown).

The CPU 120 is a control circuit. A switch 106 is closed in accordance with an instruction from the CPU 120. Then, the secondary battery 101 provides initial driving power to the above-mentioned on-off valve 82 or pressure detection sensor 83 and pressure regulating valve 84. The device load part 103 is, for example, a current detector for detecting the residual capacity of the secondary battery 101 or an electronic camera mountable in the cradle and having the secondary battery 101. The memory 108 stores data associated with temperature changes (tables in FIGS. 11A and 11B). The display part 109 provides a residual capacity indicator for the fuel cell battery. The input operation part 104 consists of input keys for allowing a user to operate. The temperature sensor 105 performs temperature detection. The battery compartment has the same contact terminals as the plurality of contact terminals directly connected to the signal lines 31a to 31h and the drive wires 32a to 32h.

Piping from the pressure regulating valve 84 is connected to the anode plate 62. The CPU 120 monitors not only the output signal of the temperature sensor 105 located inside the electronic equipment 100, but also the residual capacity indicator for the fuel cell 20 and a current value of the device load part 103.

When the fuel cell unit 20 is connected to the electronic equipment 100, the CPU 120 can switch the power source from the secondary battery 101 to the fuel cell unit 20 by means of the change-over switch (SW) 102. Here, output signals from the pressure detection sensor 83 and the temperature sensor 105 are used, instead of using the output signal of the device load part 103, to detect the residual capacity of the fuel cell unit 20. In other words, a residual capacity value computed from data (tables in FIGS. 11A and 11B) on the type (e.g., AB5 type of company B) and temperature characteristics of the hydrogen storage alloy container 17 stored in the memory 108 and specified by the user is used to detect the residual capacity of the fuel cell unit 20 in order to display the detected residual capacity on the display part (display) 109. This allows the user to check the residual capacity.

If the electronic equipment 100 is a camcorder, for example, a lens drive device or an optical disk drive device is assumed as the device load part 103. In this case, it is considered that the temperature sensor 105 is, for example, a thermistor temperature sensor or the like. Further, with respect to the location of the temperature sensor 105, it can be exposed on the exterior package surface, or placed in the vicinity of the battery compartment, in the vicinity of an optical disk (phase-change recording medium or perpendicular magnetic recording medium), in the vicinity of a magnetic disk, or in the vicinity of an image pickup device (CCD or CMOS). It can also be placed in the vicinity of an IC chip for a lens drive circuit, or in the vicinity of a camera module unit or a secondary battery.

Further, the temperature sensor 105 can be provided at plural locations of the electronic equipment 100. For example, among the locations, a location related to recording/playback of the electronic equipment (i.e., the vicinity of the optical disk (phase-change recording medium or perpendicular magnetic recording medium) or the vicinity of the magnetic disk, or the vicinity of the image pickup device (CCD or CMOS)) can be selected, or a location at which external environment temperature can be measured can be selected. If the temperature sensor 105 is operated in conjunction with on/off control of the fuel cell system 10, the temperature error detection performed by the control circuit (CPU 120) can be simplified, reducing the electric power consumption of the fuel cell system 10.

Referring also to FIG. 2, the driving of the sinusoidal voltage circuit 40 is started in accordance with an instruction from the CPU 120. The output signal of the sinusoidal voltage circuit 40 forces the diaphragm 43 to vibrate through the drive circuit of the IC chip (DRV-HAIC chip) 38 for the drive circuit/amplitude amplifier circuit. The amplitude of the output signal varies as the pressure of the diaphragm 43 increases or decreases. This output signal is input to the CPU 120 of the electronic equipment 100 through the amplitude amplifier circuit (head amplifier) of the IC chip (DRV-HAIC chip) 38 for the drive circuit/amplitude amplifier circuit. The CPU 120 performs feedback control based on a reference value from the memory (ROM) 108.

Figure 6:
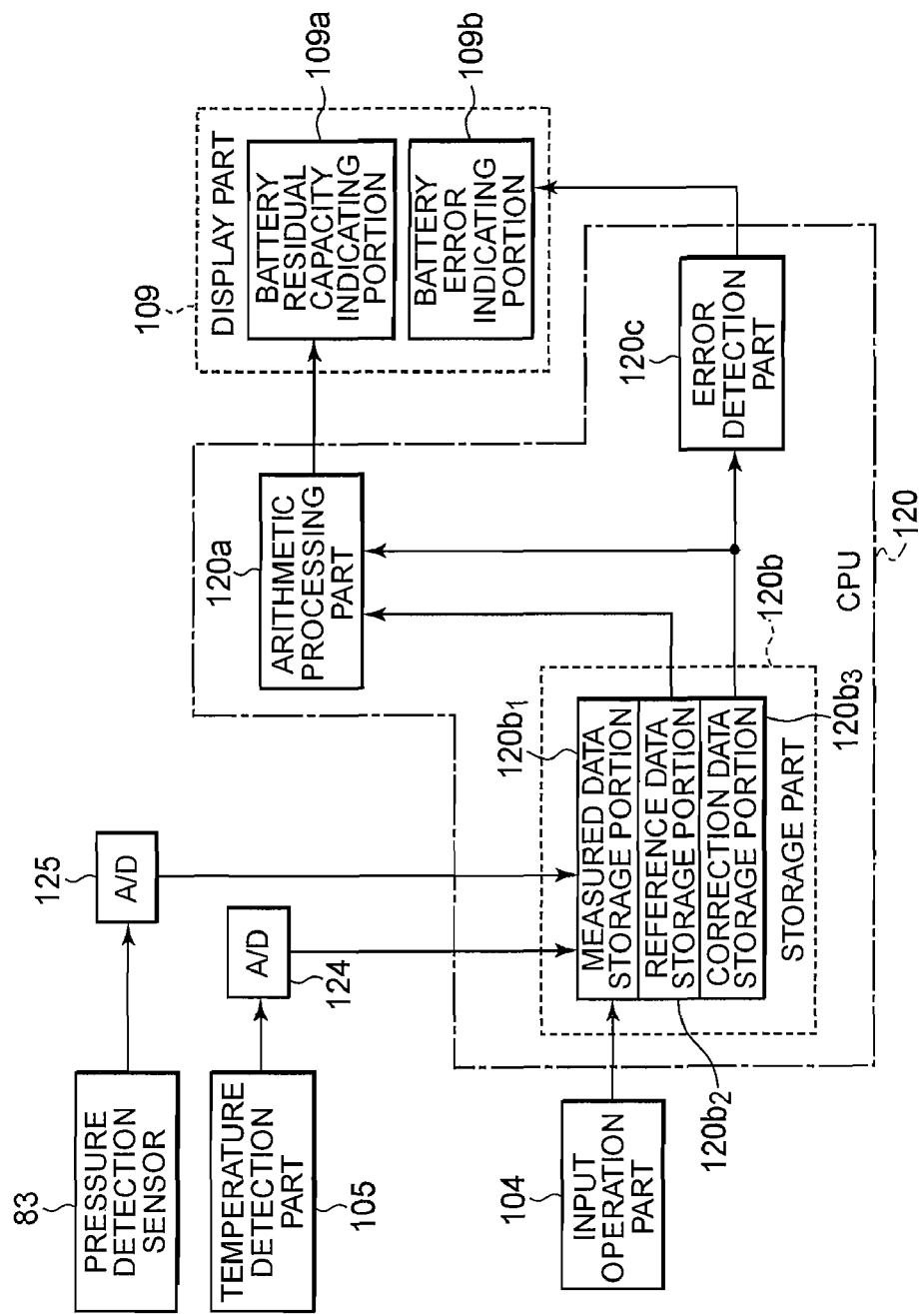
FIG. 6 is a block diagram showing the structure of the CPU and the vicinity for explaining residual capacity detection and battery error detection for the fuel cell battery.

FIG. 6 is a block diagram showing the structure of the CPU 120 and the vicinity for explaining residual capacity detection and battery error detection for the fuel cell battery.

In FIG. 6, the CPU (microprocessor) 120 performing various control according to a program includes an arithmetic processing part 120a, a storage part 120b for working memory, and an error detection part 120c. The storage part 120b has a measured data storage portion $120b_1$, a reference data storage portion $120b_2$ storing data tables, for example, as shown in FIGS. 11A and 11B to be described later, and a correction data storage portion $120b_3$. Though not shown, the CPU 120 also includes a ROM for storage of a program to be described later.

The pressure detection sensor 83 is connected to the storage part 120b through an A/D converter 125, and the temperature detection part (temperature sensor) 105 is also connected to the storage part 120b through an A/D converter 124. Further, the input operation part 104 is connected to the storage part 120b. The storage part 120b for working memory is connected to the display part 109 through the arithmetic processing part 120a and the error detection part 120c. This display part 109 has a battery residual capacity indicating portion 109a for indicating a residual battery capacity, and a battery error indicating portion 109b for indicating an error in the battery. For example, the residual capacity can be indicated by changing colors depending on the type of fuel cell or displaying the available time together therewith.

The error detection part 120c is provided to disconnect between the fuel cell 20 and the device load part 103. When the error detection part 120c disconnects between the fuel cell 20 and the device load part 103, for example, the switching action of a step-up DC/DC converter is used to disconnect the device load part 103 from the fuel cell 20 in order to stop electric power generation. Then, when the fuel cell 20 has stopped electric power generation, the fuel cell 20 is connected to the secondary battery 101. In other words, after stop of electric power generation in the fuel cell 20, the CPU 120 changes the connection of the output terminal of the fuel cell 20 from the device load part 103 to the secondary battery 101 to charge the secondary battery 101 with residual electric power generated from hydrogen and air remaining in the fuel cell 20. This structure eliminates the need to discharge hydrogen remaining in the fuel cell system 10 to the outside. In this structure, an empty space equal to or more than a predetermined value is secured in the secondary battery 101 before charging the secondary battery 101.

Figure 7A:
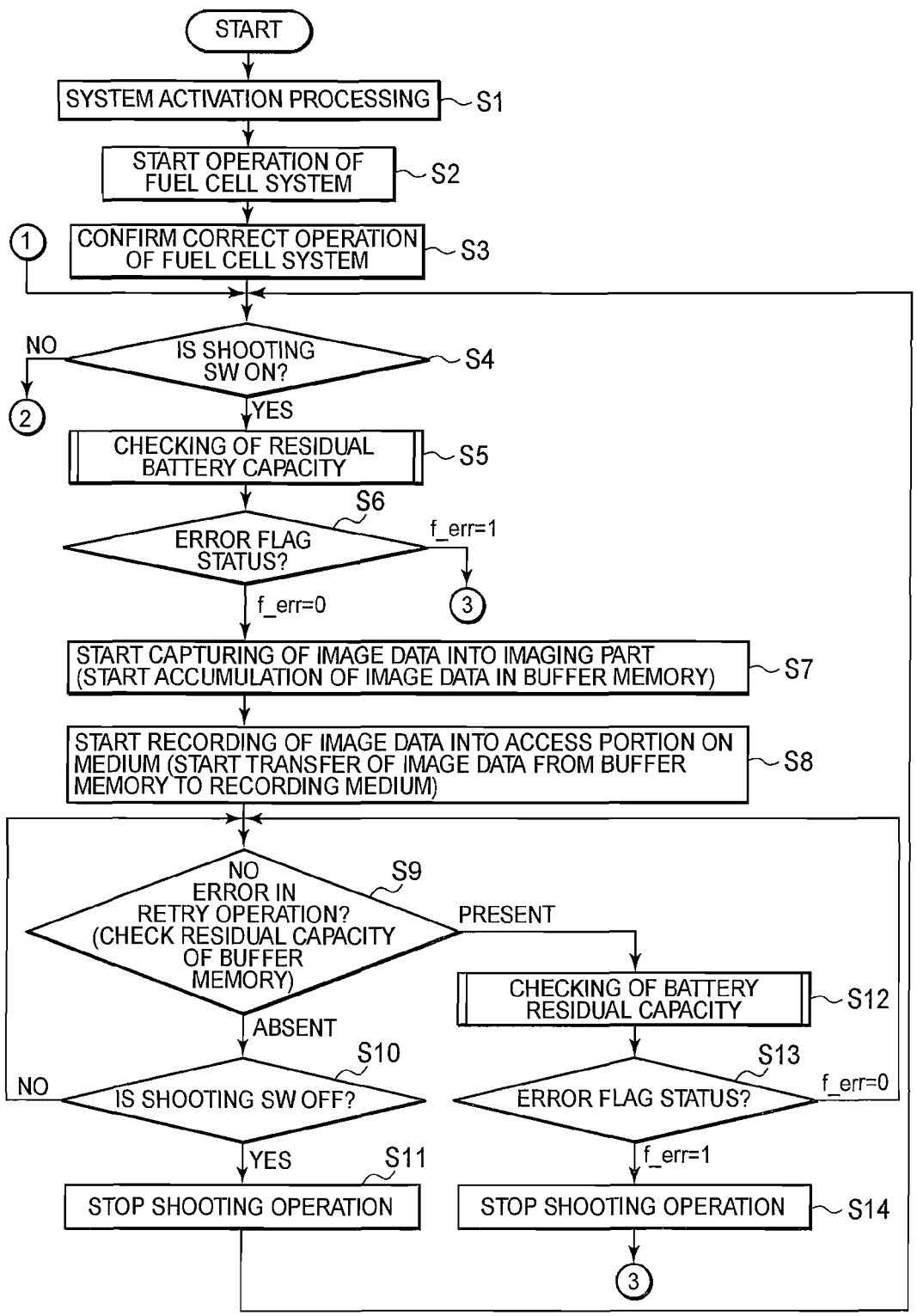
FIG. 7A is a flowchart for explaining a main routine of residual capacity detection of the fuel cell system in the electronic equipment.
Figure 7B:
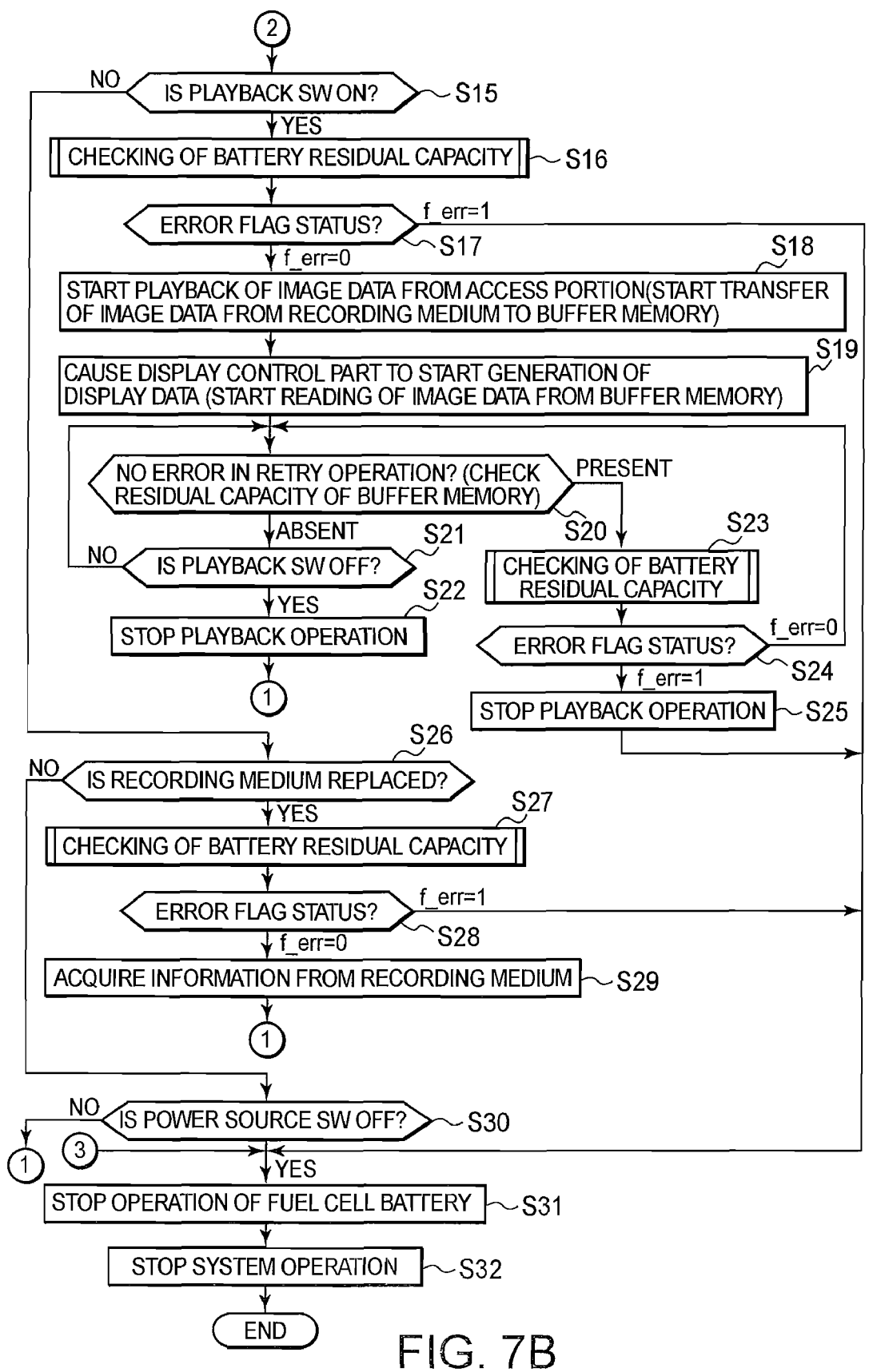
FIG. 7B is a flowchart for explaining the main routine of residual capacity detection of the fuel cell system in the electronic equipment.

Referring next to flowcharts of FIGS. 7A and 7B, the operation of a main routine for residual capacity detection of the fuel cell system 10 in the electronic equipment (in case of use of a camcorder with an optical disk recording medium) will be described. Note that it is assumed here that an electronic camera is used as the device load part 103.

In the above-mentioned structure, activation processing for the fuel cell system 10 is first performed in step S1. Then, in step S2, the operation of the fuel cell system 10 is started. Then, in step S3, the correct operation of the fuel cell system 10 is confirmed. Here, the correct operation is confirmed by the arithmetic processing part (CPU) 120a recognizing that the output signals from the temperature sensor 105, the pressure detection sensor 83, and the pressure regulating valve 84 fall within a predetermined range. When the arithmetic processing part 120a judges the "correct operation," the procedure proceeds to step S4.

In step S4, it is checked "if an operation SW (switch) is operated or not" on the input operation part 104. If the operation SW (switch) has been turned on by the user, the procedure proceeds to step S5, while if it has not been turned on, the procedure shifts to step S15 to be described later. Here, since the device load part 103 is an electronic camera, the operation SW can be considered, for example, as a shooting SW. In step S5, a subroutine "checking of residual battery capacity" is executed. The details of this subroutine "checking of residual battery capacity" will be described later.

After the subroutine "checking of residual battery capacity" is executed in step S5, "error flag status" is judged in the next step S6. If the error flag is set (f_err=1), the procedure shifts to step S31 to be described later, while if the error flag is cleared (f_err=0), the procedure proceeds to step S7.

In step S7, the electronic camera as the device load part 103 starts capturing image data into imaging part (not shown), i.e., it starts accumulation of image data in a buffer memory.

Next, in step S8, recording of the image data into an access portion on a recording medium is started, i.e., transfer of the image data from the buffer memory to the recording medium (not shown) is started.

For example, if the recording medium is an optical disk, an optical head moves to a sector at a recording start position on a desired track of the optical disk recording medium upon random access control in accordance with a recording start instruction from a control circuit (CPU) of an optical disk unit. At this time, if access to this recording start position cannot be performed, a retry is made. On the other hand, upon playback of a recorded image, image information data recorded in different sector areas on the desired track of the optical disk recording medium are sequentially reproduced at a higher speed than the access time of an optical head for playback, and stored in the buffer memory in order to play back the image data on a display screen. At this time, a retry is also made when the optical head cannot be moved onto the desired track of the optical disk, and during the retry operation upon playback, the image information data are continuously output from the buffer memory to the display screen.

Next, in step S9, the status of the retry operation is judged, for example, by checking the residual capacity of the buffer memory. Here, if there is no error, the procedure proceeds to step S10 to check "if the operation SW (switch) has been turned off." For example, it is checked if the shooting SW of the electronic camera has been turned off. Here, if the operation SW (switch) has not been turned off by the user, the procedure returns to step S9. On the other hand, it is determined in step S10 that the operation SW (switch) has been turned off, processing for stopping the shooting operation is performed in step S11. After that, the procedure returns to step S4.

If it is determined in step S9 that the status of the retry operation is judged as an error, the procedure proceeds to step 12 to execute the subroutine "checking of residual battery capacity" to be described in detail later. Next, the "error flag status" is judged in step S13. Here, if the error flag is set (f_err=1), the processing for stopping the shooting operation is performed in the following step S14, and after that, the procedure shifts to step S31 to be described later. On the other hand, if the error flag is cleared (f_err=0) in step S13, the procedure returns to step S9.

If it is determined in step S4 that the operation SW (switch), e.g., the shooting SW, has not been turned on, the status of a playback SW (switch), not shown, is judged in step S15. Here, if the playback SW (switch) has not bee turned on, the procedure shifts to step S26 to be described later. On the other hand, if the playback SW (switch) has been turned on, the procedure proceeds to step S16 to execute the subroutine "checking of residual battery capacity" to be described in detail later.

Next, in step S17, the "error flag status" is judged. Here, if the error flag is set (f_err=1), the procedure shifts to step S31 to be described later. On the other hand, if the error flag is cleared (f_err=0) in step S17, the procedure proceeds to step S18.

In step S18, the playback of image data from the above-mentioned access portion of the recording medium is started, i.e., transfer of the image data from the recording medium to the buffer memory (not shown) is started. Next, in step S19, a display control part, not shown, starts generating display data, i.e., reading of the image data from the buffer memory is started.

Next, in step S20, it is judged whether there is no error in the retry operation, for example, by checking the residual capacity of the buffer memory. Here, if there is no error, the procedure proceeds to step S21 to judge the operation status of the playback SW (switch). Here, the procedure returns to step S20 unless the playback SW (switch) is turned off by the user. On the other hand, if it is determined in step S21 that the playback SW (switch) has been turned off, processing for stopping the playback operation is performed in step S22. After that, the procedure returns to step S4.

If it is determined in step S20 that the status of the retry operation is judged as an error, the procedure goes to step 23 to execute the subroutine "checking of residual battery capacity" to be described in detail later. Next, in step S24, the "error flag status" is judged. Here, if the error flag is set (f_err=1), the processing for stopping the playback operation is performed in the following step S25 to be described later, and after that, the procedure shifts to step S31. On the other hand, if it is judged in the step S24 that the error flag is cleared (f_err=0), the procedure returns to step S20.

If it is determined in step S15 that the playback SW (switch) has not been turned on, it is then determined in step S26 whether the recording medium, not shown, is replaced or not. If the recording medium has been replaced, the procedure proceeds to step S27 to execute the subroutine "checking of residual battery capacity" to be described in detail later. Next, in step S28, the "error flag status" is judged. Here, if the error flag is set (f_err=1), the procedure goes to step S31 to be described later. On the other hand, if it is judged in step S28 that the error flag is cleared (f_err=0), the procedure proceeds to step S29 to acquire information from the recording medium, and after that, the procedure returns to step S4.

If it is determined in step S26 that the recording medium is not replaced, the status of a power source SW (switch), not shown, is judged in step S30. Here, if the power switch has not been turned off, the procedure returns to step S4 to repeat the sequence of operations after the step. On the other hand, if it is judged in step S30 that the power source SW (switch) has been turned off, the procedure proceeds to step S31 to stop the operation of the fuel cell battery. Then, in step S32, processing for stopping the fuel cell system is performed, and after that, this routine is ended.

Figure 7C:
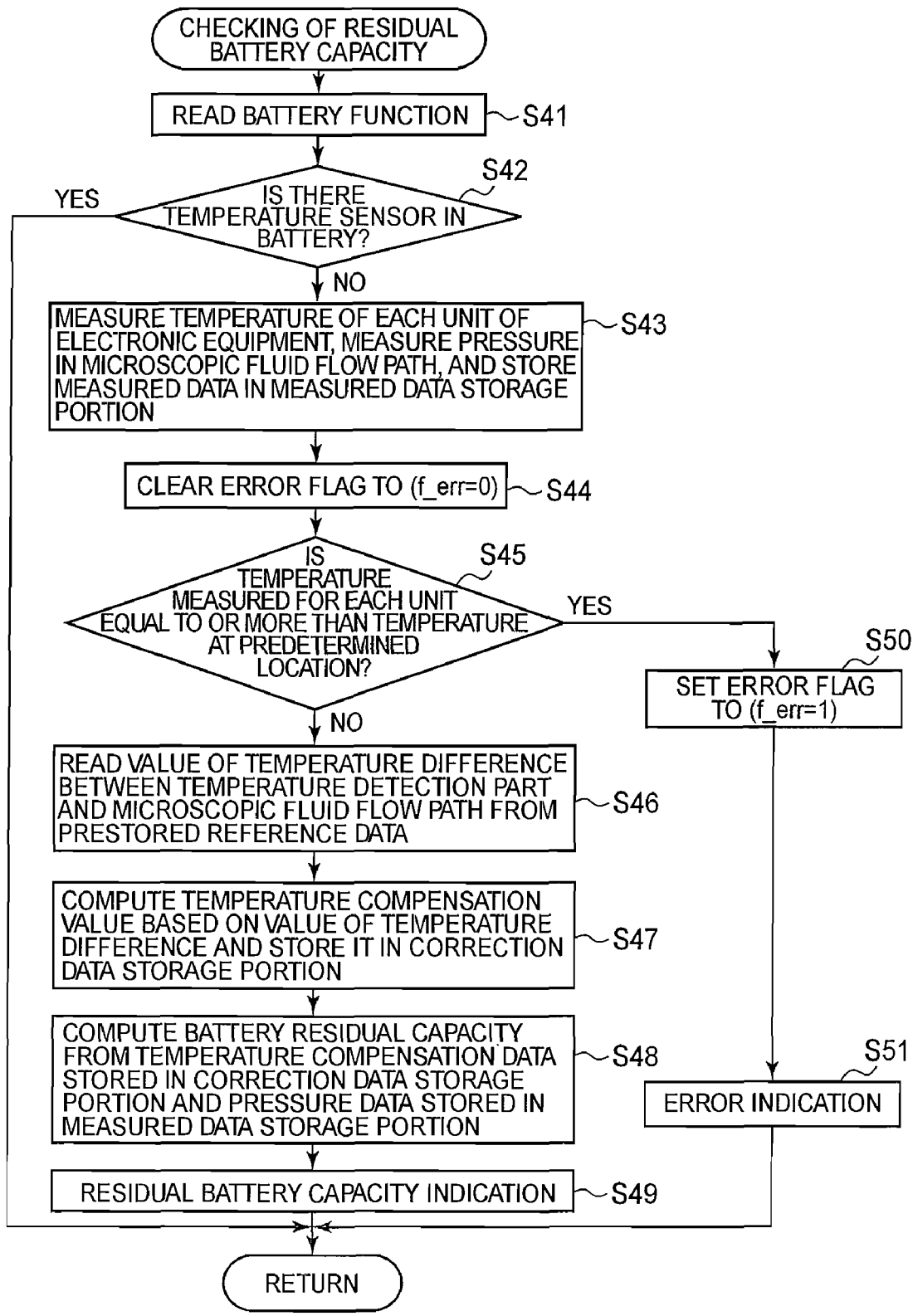
FIG. 7C is a flowchart for explaining a subroutine "checking of residual battery capacity" in the fuel cell system according to the first embodiment of the present invention.

Referring next to a flowchart of FIG. 7C, the processing operation of the subroutine "checking of residual battery capacity" in the fuel cell system of the embodiment will be described. Note that the subroutine in steps S5, S12, S16, S23, and S27 in the flowcharts of FIGS. 7A and 7B are the same.

When entering this subroutine, the battery function is first read out in a known manner in step S41. Next, it is determined in step S42 whether there is a temperature sensor in the fuel cell unit 20. Here, if there is a temperature sensor in the fuel cell unit 20, here, the procedure exits from this subroutine to a corresponding step S6, S12, S16, S23, or S28 in the flowcharts of FIGS. 7A and 7B. In this case, information (residual capacity, error, etc.) can, of course, be displayed on the display part 109 according to the temperature detected by the temperature sensor provided in the fuel cell battery. On the other hand, if it is determined that there is no temperature sensor in the battery, the procedure proceeds to step S43.

In step S43, a plurality of measured data from the temperature sensor 105 exposed to the outside of the electronic equipment (e.g., electronic camera) 100 or built in an IC chip for the lens drive circuit are sampled by the CPU 120, and written to the measured data storage portion $120b_1$ in the storage part $120b$ through the A/D converter 124. At this time, if the sampling is performed plural times, an average value is determined.

Upon this sampling, the CPU 120 selects one of portions related to temperature detection, and writes it to the measured data storage portion $120b_1$. For example, there are portions exposed on the exterior package surface, in the vicinity of the battery compartment or the disk (phase-change recording medium or amorphous perpendicular magnetic recording medium), or in the vicinity of the image pickup device (CCD or CMOS). As the temperature sensor 105, a thermistor for temperature detection arranged in the IC chip for the lens drive circuit or in the secondary battery can be considered. The temperature sensor 105 can also be arranged in the vicinity of a disk (phase-change recording medium or amorphous perpendicular magnetic recording medium) or in a portion related to generation of image data for recording or playback in the vicinity of the image pickup device (CCD or CMOS).

If the temperature detection part 105 located in the vicinity of the disk (phase-change recording medium or amorphous perpendicular magnetic recording medium) or the image pickup device (CCD or CMOS) is selected, the CPU 120 can disconnect between the fuel cell 90 and the device load part 103 properly upon an abrupt temperature rise in the electronic equipment. As a result, the consumption of the fuel cell can be reduced.

Further, a plurality of measured data of pressures in microscopic fluid flow paths 21, 22 from the pressure detection sensor 83 are sampled and written to the measured data storage portion $120b_1$ through the A/D converter 125. At this time, if the sampling is performed plural times, an average value is determined. Further, if the respective pressure sensors of the pressure detection sensor 83 and the pressure regulating valve 84 are arranged in parallel, measured data from the two portions are written to the measured data storage portion $120b_1$ through the A/D converter.

On the other hand, if the pressure detection sensor for microscopic fluid flow paths before factory shipment, and the respective temperature sensors of the on-off valve and the pressure regulating valve are arranged in parallel, these measured data are written to the reference data storage portion $120b_2$ through the A/D converter. This makes it possible to determine a temperature difference more accurately even if the fluid flow path is complicated.

As mentioned above, temperature and the like detected in the temperature detection part (temperature sensor 105) of the electronic equipment are written to the measured data storage portion $120b_1$ (step S43). Then, in step S43, the temperature of the electronic equipment and the pressure in the microscopic fluid flow path measured in the temperature detection part are stored.

Next, the error flag is cleared (f_err=0) in step S44.

In step S45, it is determined whether temperature measured for each unit is equal to or more than temperature at a predetermined location. Here, the temperature at the predetermined location represents temperature in the vicinity of the image pickup device or the disk, or output of a temperature sensor in the vicinity of the battery compartment.

The temperature and pressure values written in the measured data storage portion $120b_1$ are determined to be an error or not in view of a line pressure limit and a line temperature limit shown in FIG. 11 to be described later. Then, a flag signal "1" (=error) or "0" (=normal) is generated and written to the correction data storage portion $120b_3$. The flag signal "1" (=error) or "0" (=normal) thus written in the correction data storage portion $120b_3$ is detected in the error detection part 120c. Then, if it indicates an error (i.e., if it indicates temperature equal to or more than the temperature at the predetermined location), the procedure shifts to step S50 to set the error flag (f_err=1). After that, the procedure proceeds to step S51 to output an error indicator corresponding to the signal to the battery error indicating portion 109b on the display part 109. This indication is made, for example, by blinking an LED or providing a message in the battery error indicating portion 109b saying, for example, "Battery error. Remove the battery and load it later."

On the other hand, if the flag signal indicates the normal state, the procedure proceeds to step S46 to read, from prestored reference data, a difference between the temperature detected by the temperature detection part inside the electronic equipment and the temperature in the microscopic fluid flow path. The prestored reference data will be described later as a PCT coefficient. Then, in step S47, a compensation value is computed based on the temperature difference stored in the reference data storage portion $120b_2$, and the computed compensation value is written to the correction data storage portion $120b_3$.

In step S48, based on data in the reference data storage portion $120b_2$, the arithmetic processing part 120a computes a battery residual capacity from the detected pressure value written in the measured data storage portion $120b_1$ and the temperature value written in the correction data storage portion $120b_3$. After that, in step S49, the indication of the computed residual capacity is provided in the residual battery capacity indicating portion 109a on the display part 109.

Specifically, the temperature sensor for detecting temperature in the microscopic fluid flow path measured to get data before factory shipment is provided in plural and arranged in parallel on the first silicon substrate 13 within the cavity portion 44 shown in FIG. 2, or at locations corresponding to the cavity portions of the pressure regulating valve, the on-off valve, and the pressure detection sensor. This temperature sensor is joined to each portion as a micro-temperature sensor.

Figure 8:
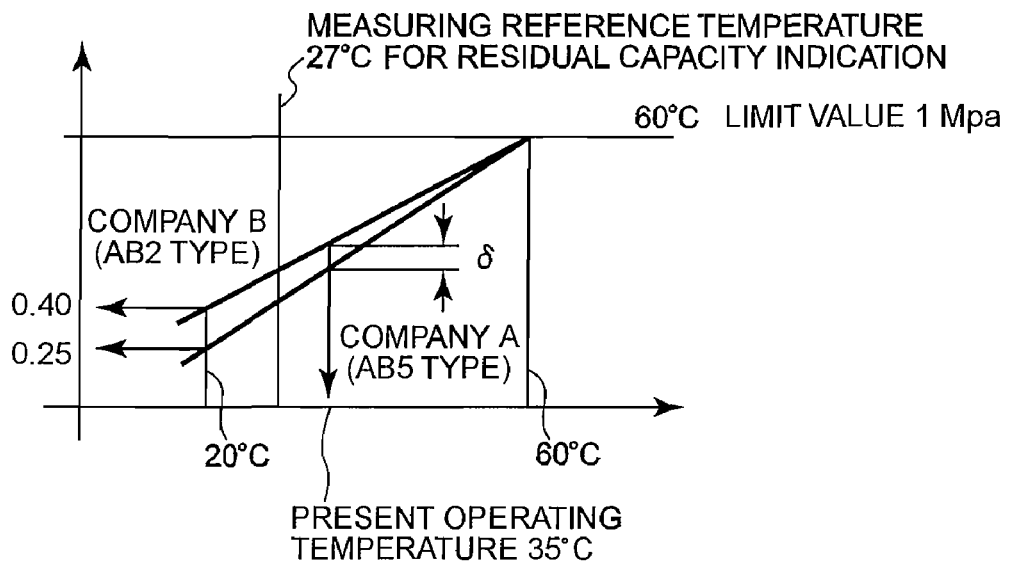
FIG. 8 is a graph for explaining applied voltage from a pressure detection sensor to a pressure regulating valve on a silicon substrate.

Referring next to FIG. 8, applied voltage from the pressure detection sensor on the silicon substrate to the pressure regulating valve will be described.

As shown in FIG. 8, the description is made by taking AB5 type LaNi5 and AB2 type alloys as hydrogen storage alloy materials. The temperature/pressure versus residual capacity characteristics in these alloy materials vary from manufacturer to manufacturer, or depending on the type of the same manufacturer. In the embodiment, the temperature/pressure versus residual capacity characteristics are used to decide voltage to be applied to the pressure regulating valve is decided based on a table. This makes it possible to compensate for a difference resulting from the difference between hydrogen storage alloy materials. For example, if the temperature characteristics are difference between hydrogen storage alloy of company A and hydrogen storage alloy of company B, a δ value obtained at a present operating temperature of 35 degrees C. can be compensated for. In this case, the hydrogen storage alloy of company A and the hydrogen storage alloy of company B exhibit 0.25 MPa and 0.40 MPa at 20 degrees C., respectively, and both have a limit value of 1 MPa.

Further, the pressure reference temperature for residual capacity indication is set to 27 degrees C.

One of properties required for the hydrogen storage alloy material is fast reaction. Further, the hydrogen storage alloy material has a hysteresis in absorption pressure and desorption equilibrium pressure. Here, it is intended to compensate for these property differences resulting from the material difference and the like. In this case, a temperature difference between the temperature at the location of the temperature sensor 105, and the inner pressure temperature in the piping A from the hydrogen storage alloy container housing 18, and the inner pressure temperature in the pressure sensor should be considered. It is difficult to measure the residual capacity and provide the residual capacity indicator each time depending on the usage status of the electronic equipment 100.

Figure 9:
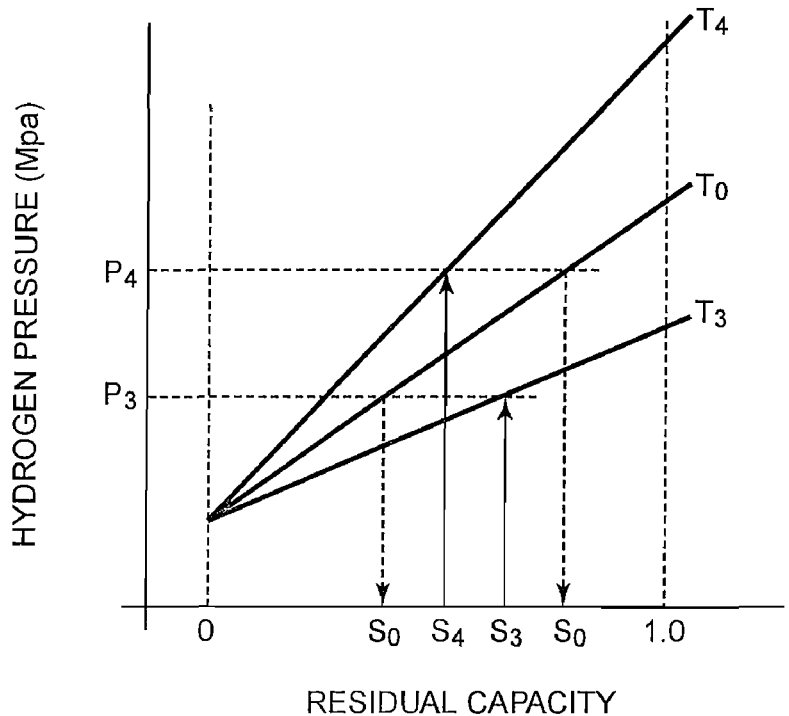
FIG. 9 is a graph showing pressure-residual capacity lines for a plurality of temperature characteristics.

In FIG. 8, the default temperature value is set to 20 degrees C. and the present operating temperature is set to 35 degrees C. Based on pressure sensor values at 27.5 degrees C. as the average value (which can be determined as 27 degrees C. from a predetermined temperature range in accordance with an instruction from the CPU), a residual capacity indicator value can be determined from a PCT line as shown in FIG. 9. This can reduce errors in the residual capacity indicator without being affected by overpressure due to temperature changes.

Here, use of the average value or grouping (a method of preplotting points of temperature in a temperature measurement range every 2 or 3 degrees C. to decide on measuring points so as to treat points within a predetermined upper and lower range of the decided measuring points as the same measuring points) can reduce the storage capacity of a memory storing the pressure lines for each premeasured temperature as factory default settings. Further, though not shown, when plural pairs of drive electrode plates using an oscillator in an inner wall of the hydrogen storage alloy container 17 is joined to the diaphragm to form the pressure sensor structure, there is also a temperature difference between the location of the temperature sensor and the inside of the hydrogen storage alloy container 18 covered with the metal material. In this case, the pair of drive electrode plates in the hydrogen storage alloy container 17 can be spaced apart from each other so that the output signal can be switched to a differential output signal in case of less residual battery capacity. Thus, since there is an environmental difference, a temperature table based on the average value of the present use environment temperature of 35 degrees C. and the normal temperature of 20 degrees C. used as the temperature characteristics is employed.

When the residual capacity is measured using a pair of drive electrode plates in the hydrogen storage alloy container 17, or when the amount of residual hydrogen is measured using a known strain gauge (Japanese Patent Application Laid-Open No. 6-66787), a data characteristics table is predetermined before shipment. In this case, the same case as the product is fabricated, and a thermo-module is attached on the outer surface of the case to change the output of the temperature sensor at 20, 23, 27, 30, 32, 35, 40, and 45 degrees C. Then, the valve of the hydrogen storage alloy container 17 is opened, and the amount of discharged hydrogen is determined at each temperature using a hydrogen flowmeter to determine the amount of residual hydrogen from a corresponding pair of drive electrode plates through an amplitude voltage circuit. In other words, in the structure of a fuel cell of FIG. 10A, the total consumption time of the fuel cell in relation to each amount of discharged hydrogen is determined.

The residual capacity indicator indicates the residual capacity time or residual capacity time/total consumption time in percentages, the residual capacity time is determined by subtracting, from the total consumption time, a cumulative time determined from the frequencies of use and the used hours of the pressure regulating valve and the relief valve. Further, a PCT coefficient at each temperature and a correlation (weighting) are decided. Data thus obtained (i.e., the tables of FIGS. 11A and 11B) are stored in the ROM 108. This can omit the residual capacity detection sensor provided in the hydrogen storage alloy container.

A thermo-module (e.g., Peltier element) circuit board is arranged in a recessed portion of the outer surface of the hydrogen storage alloy container housing 18 fabricated of a stainless steel material as the metal material to allow the CPU to perform temperature control so as to set the temperature stably to 20 degrees C. (normal temperature). As a result, the output signal of the pressure detection sensor can be stabilized. This makes it possible to store only data near the normal temperature (20 degrees C.), and hence to drastically reduce the storage capacity of the memory (e.g., ROM 108).

The PCT coefficient will be described below.

In order to provide the residual capacity indicator in such a structure that no temperature sensor is provided on the silicon substrate of the fuel cell system, an example of use of each temperature sensor provided in the electronic equipment will be described below.

If the PCT coefficient is used to take a correlation in temperature difference between the temperature at the location of the temperature sensor in the electronic equipment and the temperature in the hydrogen piping on the silicon substrate in the fuel cell system, an accurate residual capacity can be displayed without detecting an overrated or underrated residual capacity.

In case of use of a temperature sensor such as a thermistor for converting the temperature of the fuel cell compartment in the vicinity of the fuel cell or of the secondary battery unit into electric resistance, the temperature of the secondary battery detected in the temperature detection part exposed on the surface of the fuel cell or the secondary battery unit is used to provide the residual capacity indicator through the A/D converter for converting an analog signal to a digital signal. Therefore, the numerical value of the temperature is output to the arithmetic processing part 120a in the CPU 120 to compute the PCT coefficient. The temperature sensor 105 detects the temperature of the fuel cell compartment in the vicinity of the fuel cell or of the secondary battery 101 every predetermined time interval during several sampling cycles, and outputs the temperature of the fuel cell compartment in the vicinity of the fuel cell or of the secondary battery 101 to the arithmetic processing part 120a for computing a PCT coefficient. In this arithmetic processing part 120a, the PCT coefficient is computed to take a correlation between the temperature at the location of the temperature sensor 105 in the electronic equipment 100 and the line temperature in the fuel cell 90.

FIG. 9 is a graph showing pressure-residual capacity lines for a plurality of temperature characteristics. Referring to FIG. 9, conversion to a table $T_0$ temperature for residual capacity indicator using PCT coefficient $\delta_{PCT}$ will be described. In FIG. 9, the residual capacity of the fuel cell at actually measured temperature is indicated by solid lines and the residual capacity of the fuel cell at temperature in the hydrogen gas flow path is indicated by broken lines.

Here, it is assumed that the hydrogen pressure value is $P_4$ MPa on condition that the temperature of the fuel cell is 30 degrees C. or the secondary battery temperature is $T_4$ (30 degrees C.). In other words, actual measurements are made on a camera model basis to determine temperature $T_0$ in the hydrogen piping of the fuel cell battery in which he pressure detection sensor is provided. Here, for example, if the temperature in the hydrogen piping is $T_0$ (27 degrees C.), the PCT coefficient is $\delta_{PCT}=T_0-T_4$.

Thus, since the PCT coefficient is computed based on the temperature difference, the temperature in the hydrogen piping can be determined even if the temperature sensor is not built in the fuel cell unit. Further, when the temperature rises to the temperature (33 degrees C.) of the fuel cell compartment in the vicinity of the fuel cell or the secondary battery temperature rises to $T_4$ (33 degrees C.), it becomes the temperature in the hydrogen piping $T_0$ (30 degrees C.), and the PCT coefficient $\delta_{PCT}$ results in a different of 3 degrees C.

The PCT coefficient can also be used in such a case that a temperature detection part is arranged in a camera module unit such as a single-lens reflex camera, or for a waterproof digital camera having a detection part exposed on the digital camera to detect the water depth, water pressure/humidity, and unillustrated water pressure, and temperature (with humidity corrected) to enable retrieval from an album of shot images based on position information such as the above-mentioned data.

Further, to be more specific, the PCT coefficient can be used for a mechanism to open/close a cover for protecting a camera lens against low temperature in a cold environment, and a digital camera and the like provided with a drive circuit. Further, in case of a waterproof digital camera used in shooting in the water or the sea, the hydrogen pressure value is set to $P_s$ MPa at surface temperature $T_3$ (10 to 20 degrees C.). Alternatively, the PCT coefficient can be decided for each use environment, such as for use in an alpine mountain where atmospheric pressure changes.

In case of digital cameras for outdoor shooting, the surface temperature is set to $T_1$ (35 degrees C.), and correction data for correcting the outside atmospheric pressure is stored in a memory in any of the digital cameras. Specifically, in an alpine area or in the water, the residual capacity indicator can be stopped, and a warning message saying, for example, "Residual capacity indicator is stopped" can be displayed instead on the display screen.

If temperature $T_0$ (27 degrees C.) in the hydrogen piping of the fuel cell in which the pressure detection sensor is provided is selected, the PCT coefficient is $\delta_{PCT}=T_0-T_1$.

The PCT coefficient is so computed that a temperature difference in the hydrogen piping can be determined even if no temperature sensor is incorporated in the fuel cell unit.

Further, the temperature in the camera module unit is set to $T_2$ (25 degrees C.). In this case, if the temperature $T_0$ (27 degrees C.) in the hydrogen piping of the fuel cell in which the pressure detection sensor is provided is selected, the PCT coefficient is $\delta_{PCT}=T_0-T_2$.

Thus, since any temperature sensor arranged at any location is selected to compute each corresponding PCT coefficient as mentioned above, the temperature in the hydrogen piping can be determined even if no temperature sensor is incorporated in the fuel cell unit.

The criteria for selecting one temperature sensor from a plurality of temperature sensors are as follows:

(i) Among the plurality of temperature sensors arranged in the electronic equipment, a temperature sensor arranged at a position at which the fuel cell system is located in the optimum environment after it is loaded in the battery compartment of the electronic equipment (i.e., at a desired position less likely to be affected by changes in temperature in the electronic equipment upon recording on or playback from a recording medium in case of use of terminal equipment such as an electronic camera, or changes in the external environment) is selected. This makes it possible to prevent an error in the residual capacity indicator of the fuel cell due to a detection error in the temperature sensor.

(ii) Among the plurality of temperature sensors arranged in the electronic equipment, a temperature sensor arranged closest to the fuel cell system (e.g., in the battery compartment) is selected. In this case, the temperature sensor measures a temperature distribution approximately equal to the temperature inside the microscopic fluid flow path, so that the memory capacity for data on pressure-temperature versus residual capacity, and the like can be reduced.

(iii) A temperature sensor in the vicinity of the image pickup device or the recording medium is selected. This enables a quick response to a recording disabling signal generated upon occurrence of a temperature error in the electronic equipment, resulting in reduction of wasted power consumption in the fuel cell.

(iv) If a temperature sensor is arranged inside the battery compartment of the electronic equipment such as a cradle, the temperature sensor is positioned in the vicinity of and to face the outer surface of the fuel cell. This makes it possible to obtain temperature information dependent on temperature rise in the fuel cell, and hence to detect an accurate residual capacity from correlation with the temperature in the microscopic fluid flow path.

As other method, the thermistor attached to the battery compartment in the electronic equipment can be used instead of the temperature sensor to measure temperature inside the battery compartment so as to determine the residual capacity from the temperature difference, i.e., PCT coefficient, between the battery compartment temperature and the temperature in the hydrogen flow path on the silicon substrate.

FIG. 10 is a block diagram showing the structure of two kinds of fuel cell systems in the first embodiment of the present invention.

In FIG. 10A, hydrogen storage alloy container 17 is incorporated in the hydrogen storage alloy container housing 18 in the manner mentioned above. The on-off valve 82, the pressure detection sensor 83, and a relief valve 131, the pressure regulating valve 84, and an auxiliary pressure regulating valve 132 are arranged from this hydrogen storage alloy container 17 through piping A, not shown. The pressure regulating valve 84 and the auxiliary pressure regulating valve 132 are connected to the fuel cell unit through piping B, not shown.

The on-off valve 82 for hydrogen supply and having such a valve mechanism that opens when it is connected to the piping A and closes when it is disconnected therefrom. The relief valve 131 is connected between the pressure detection sensor 83 and outside air port. The relief valve 131 is formed of a diaphragm structure fabricated from an electrostatically driven micro-valve or a thermally deformable conductive material (e.g., shape memory alloy material) as a known technique and having a switch function capable of switching between on (valve opens) and off (valve closes).

Further, in FIG. 10B, first and second on-off valves 137, 138, and first and second pressure detection sensors 139, 140 are arranged from a hydrogen storage alloy container 135 through piping A, not shown. Then, first and second relief valves 141, 142 are arranged between the first and second pressure detection sensors 139, 140 and the outside air port. Further, first and second pressure regulating valves 143, 144 are arranged between the first and second pressure detection sensors 139, 140 and a fuel cell 145.

The following describes the operation of the fuel cell system upon supply of hydrogen to the hydrogen storage alloy container and upon actuation of the fuel cell.

Referring to FIG. 10B, upon supplying of hydrogen, not shown, the above-mentioned hydrogen tank is connected to the hydrogen supply port having such a mechanism to open the valve when the hydrogen storage alloy container 135 is removably connected, so that hydrogen is supplied to and stored in the hydrogen storage alloy inside the hydrogen storage alloy container 135 through the hydrogen supply port. The supplied hydrogen is stored in the hydrogen storage alloy, and besides, a residual amount of hydrogen gas exists in piping from the first and second on-off valves 137, 138 to the fuel cell 145 on condition that the hydrogen gas is shut off from and after the on-off valves. When the power switch (not shown) of the portable equipment is turned on, the first and second on-off valves 137, 138 open, so that gas stored in the hydrogen storage alloy is supplied to the pressure regulating valves and mixed with the residual amount of hydrogen gas, thus making it the same pressure as the inner pressure in the hydrogen storage alloy.

Next, output signals from detectors of the first and second pressure detection sensors 139, 140 are converted based on a table (e.g., tables in FIGS. 11A and 11B) stored in the memory (ROM) 108 to open a corresponding one of the pressure regulating valves. During operating time of the hydrogen fuel cell, the fuel cell 145 starts operating when the hydrogen gas pressure to the fuel cell 145 becomes 0.1 MPa. In the example (company A) shown in FIG. 10A, there exists hydrogen stored in the hydrogen storage alloy to be supplied for consumed hydrogen. The hydrogen is supplied from the on-off valve 82 to the fuel cell 20 sequentially via the pressure detection sensor 83 and the pressure regulating valve 84. The fuel cell 20 continuously operates while keeping the hydrogen pressure on the fuel cell 90 side constant to stably supply electric power to the portable equipment or the like, not shown. In this case, the pressure detection sensor 83 and the relief valve 131 are directly connected. Note that the tables in FIGS. 11A and 11B include management data for managing type of hydrogen storage alloy, hydrogen storage capacity, number of relief valves and number of flow paths, capacitance, line pressure limit, pressure sensor sensitivity, date of manufacture, etc. Further, if the discharge rate of the pressure regulating valve is computed based on the tables in FIGS. 11A and 11B, it can be detected by determining the pressure difference between actually measured values output from the first and second pressure detection sensors and actually measured values output from the first and second pressure regulating valves.

In the embodiment, in order to reduce the load on the pressure regulating valve due to high-pressure hydrogen gas, the structure in the example (company B) shown in FIG. 10B is such that plural (two in this example) first and second on-off valves 137, 138, first and second pressure detection sensors 139, 140, and first and second pressure regulating valves 143, 144 are arranged in parallel, respectively. The first and second pressure detection sensors 139, 140 are directly connected to the first and second relief valves 141, 142, respectively. The first and second relief valves 141, 142 are connected to the outside air port. The first and second on-off valves 137, 138, and the first and second relief valves 141, 142 open or close, respectively, according to the operation of the diaphragm fabricated from an electrostatically driven micro-valve or thermally deformable conductive material (for example, shape memory alloy material) as a known technique and having a switch function capable of switching between on (valve opens) and off (valve closes). As in yet another example (company C), if the second relief valve is not used, it is formed as a dummy.

Here, in case of company B, when the pressure detection sensors reach a desired value after a predetermined time period for obtaining the partial pressure of hydrogen gas, the first on-off valve 137 closes and the second on-off valve 138 opens. After the second on-off valve 138 opens, the second pressure detection sensor 140 starts monitoring. The first and second on-off valves 137, 138 repeat on/off actions based on the monitoring results of the pressure detection sensors. When the pressure detection sensors detect a desired hydrogen gas pressure, the pressure regulating valves start control the pressure in the fuel cell to 0.1 MPa. Further, in order to protect the pressure regulating valves, the plurality of on-off valves can be operated simultaneously.

In such a structure to repeat on/off actions, it is desirable that chips for CPU, analog switch, etc. be embedded in the second silicon substrate.

Figure 12:
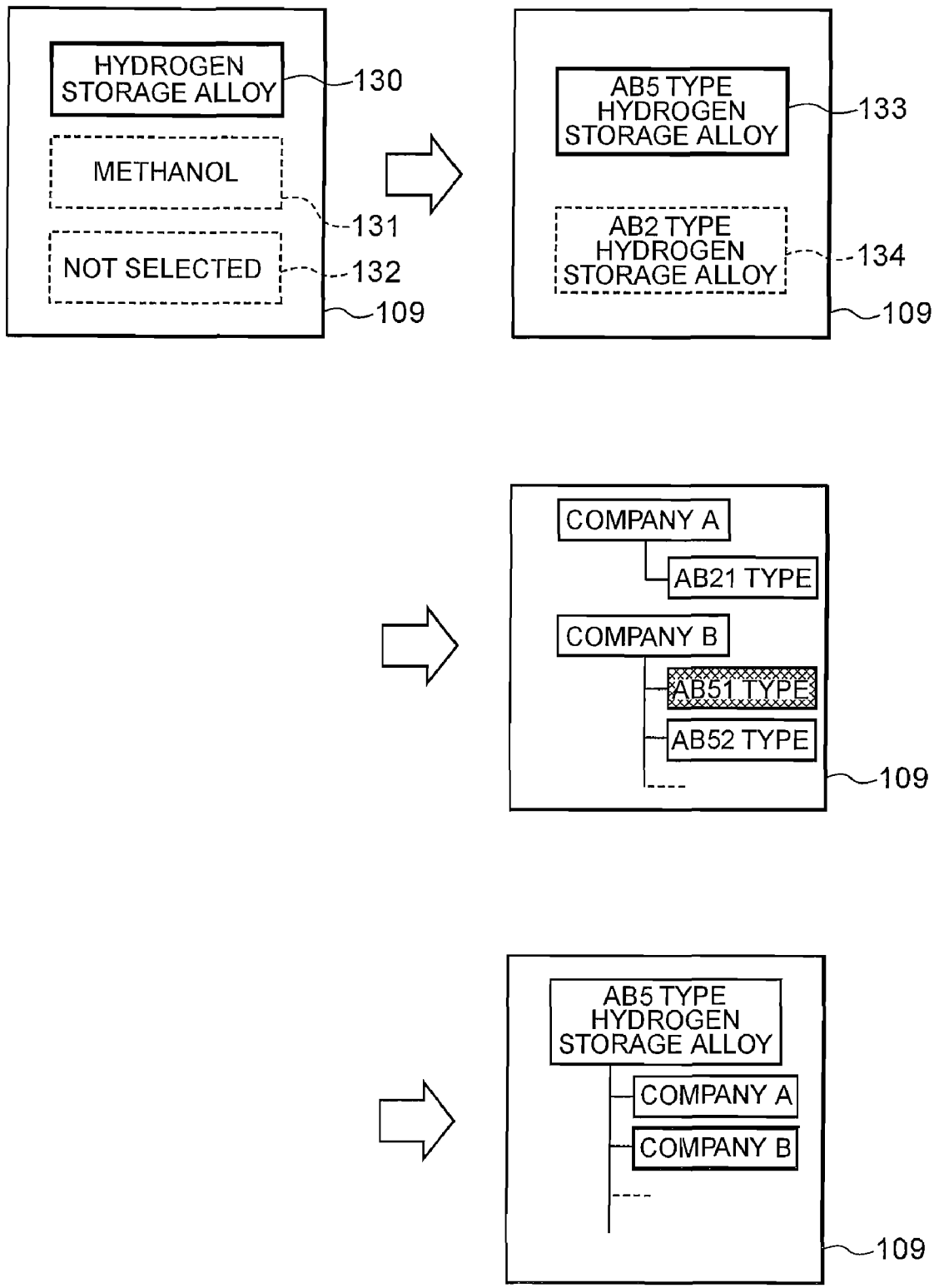
FIG. 12 shows examples of display screens for the fuel cell battery selected by user.

FIG. 12 is a diagram showing a display example of a fuel cell screen to be selected by the user.

For example, in the example shown in FIG. 12, "Hydrogen Storage Alloy" 130, "Methanol" 131, and "Not Selected" 132 are displayed in a display part 109. In this display state, when the user uses the input operation part 104 to select an option, for example, "Hydrogen Storage Alloy" 130, "AB5 Type Hydrogen Alloy" 133 and "AB2 Type Hydrogen Alloy" 134 can be displayed as shown in FIG. 12. Since the technique for display and selection of these options is well known, the description will be omitted.

Although the options can be displayed in the form of a list as also shown in FIG. 12, such a list display may be difficult for the user to use to select the loaded fuel cell battery from the list. Therefore, upon manufacturing the device load part 103, it is desirable that authorized data of types of hydrogen storage alloys available for the device load part 103 be stored in the memory 108.

Upon startup when an operation start signal for the device load part 103 is input, the CPU 120 causes the secondary battery 101 to operate. In other words, as shown in FIG. 5B, the change-over switch 102 connects the fuel cell 20 to the secondary battery 101 during charge time. In case of use of a cradle as the portable equipment, when the device load part (e.g., electronic camera) 103 is installed to cause the fuel cell 20 to operate, the CPU 120 causes the change-over switch 102 to stop the operation of the secondary battery 101. Then, the control operation of the pressure regulating valve 84 and the fuel cell 20 become active states, and the device load part 103 starts operation. In such a case, since the CPU 120 can use only the fuel cell 20 or the fuel cell 20 in combination with the secondary battery 101, this structure has the advantage of being usable outdoors where no electric outlet is available.

Second Embodiment

Next, a second embodiment of the present invention will be described.

If the fuel cell unit is constructed as mentioned above with reference to FIGS. 4A and 4B, the first metal plate 64 and the second metal plate 66 deform due to inner pressure, and the deformation may cause contact failure between the first metal plate 64 or the second metal plate 66 and the anode plate 62 or the cathode plate 63. In this case, the contact area between the first metal plate 64 or the second metal plate 66 and the anode plate 62 or the cathode plate 63 largely depends on the area occupied by the vent holes of the second metal plate 66. In general, the occupied area of the second metal plate 66 is about one-third or one-half of that of the first metal plate 64.

Therefore, in a second embodiment, the fuel cell unit is constructed as follows.

Figure 13A:
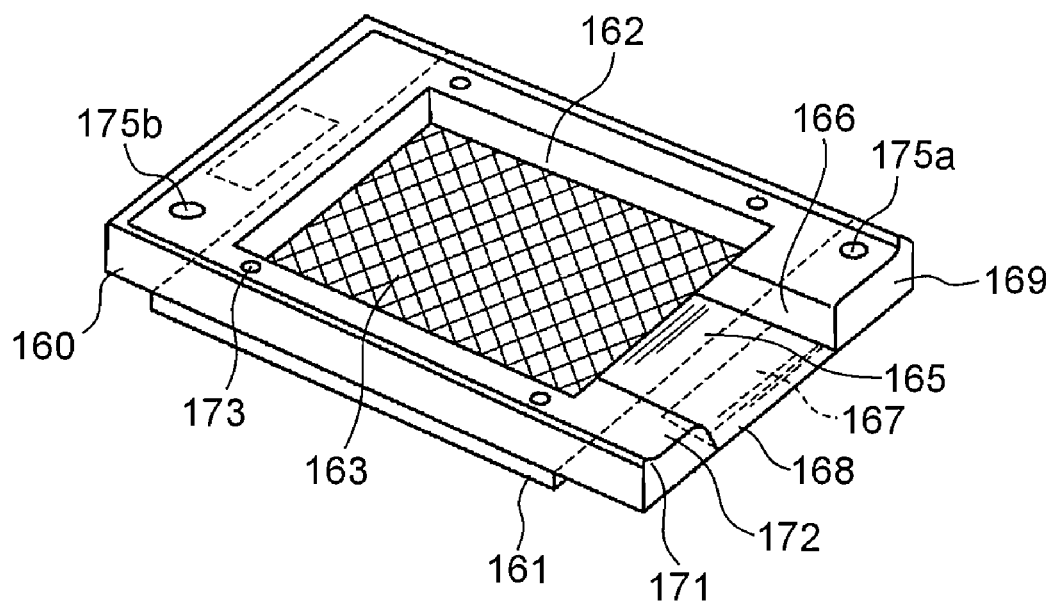
FIG. 13A is a perspective view showing a second metal plate side of a fuel cell unit according to a second embodiment of the present invention.
Figure 13B:
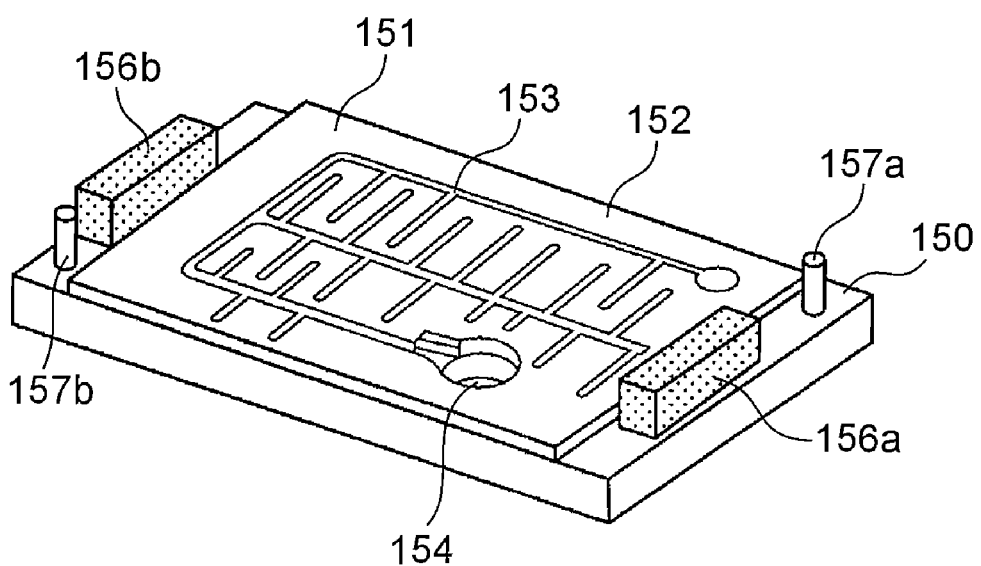
FIG. 13B is a perspective view showing a first metal plate side of the fuel cell unit according to the second embodiment of the present invention.

FIG. 13 shows the structure of a fuel cell unit according to the second embodiment of the present invention, where FIG. 13A is a perspective view showing the second metal plate side and FIG. 13B is a perspective view showing the first metal plate side.

The above-mentioned solid polymer electrolyte membrane, and an anode plate and a cathode plate fabricated from an electrically conductive porous material are laminated and combined into a unit. Further, if the fuel cell unit is assembled in such a manner that it is sandwiched between the first metal plate and the second metal plate, the flatness of the first metal plate and the second metal plate is required.

For example, vent holes 163 are formed through the second metal plate (stainless steel material) 161 by etching in a shape as shown with a thickness 0.1 mm, and the upper-layer cover 160 without the vent holes 163 is laid on the second metal plate 161 and joined together. This structure can ensure the flatness of the vent holes formed through the second metal plate accurately to a depth of 0.1 mm without unevenness.

A rectangular opening portion 162 is formed in a central portion of the upper-layer cover 160. This opening portion 162 brings air into the vent holes 163 of the second metal plate 161. A stepped portion 165 is formed to communicate with this opening portion 162. A straight-line edge of this stepped portion 165 connecting between front side faces 169 is formed into a smooth rounded shape with a radius of about 1 mm. Similarly, straight-line edges of side faces 166 of the stepped portion 165 continuously connecting with top faces of the upper-layer cover 160, respectively, are also formed into a smooth rounded shape with a radius of about 0.5 mm.

As a result of forming the stepped portion 165 in a central portion of the front side of the upper-layer cover 160, a first projection portion 171 and a second projection portion 172 are provided on both side of the stepped portion 165. The height of the second projection portion 172 is approximately 0.5 mm higher than that of the first projection portions 171 to from a level difference therebetween. These projection portions function as guide surfaces upon inserting the fuel cell system into the battery compartment of the portable equipment, not shown, and an air flow from the battery lid is supplied to the vent holes 163 of the second metal plate 161 through the stepped portion 165 and the opening portion 162.

Note that it is easy to modify the opening portion 162 in such a structure that the surface of the opening portion 162 is replaced by a surface with about 100 circular, triangular, or rectangular orifices distributed thereon to let air in through the many orifices.

The flat second metal plate 161 having the vent holes 163 and made of a stainless steel material and the upper-layer cover 160 made of a synthetic resin are fastened with rivets 173. Note that the flat second metal plate 161 and the upper-layer cover 160 can also be bonded with an adhesive agent instead of mechanical fastening such as with the rivets 173 or the like.

A pair of magnetic materials (e.g., stainless steel 304 material) 168 are bonded with an adhesive agent on a rear surface 167 of the upper-layer cover 160 in the longitudinal direction thereof. Further, a locating hole 166b paired with a locating hole 166a is provided in the vicinity of the magnetic material 168.

On the other hand, if the solid polymer electrolyte membrane, the anode plate, the cathode plate, and the first metal plate are formed to have the same area as the second metal plate, and the hydrogen flow path is formed in the first metal plate, there is an issue of making the depth of the hydrogen flow path uniform.

In order to solve this issue, an Ni material is laminated on the first metal plate made of a stainless steel material to be fitted with piping B by hot pressing or mechanical fastening such as with rivets or the like and polymerized. In this case, the hydrogen flow path is formed by etching in the Ni material before being laminated on the first metal plate.

For example, as shown in FIG. 13B, a hydrogen flow path 153 is formed by etching in an Ni plate 152 to a thickness 0.1 mm in a shape as shown, and the Ni plate 152 is laminated on and joined together with a first metal plate 151 having only a hole for piping B 154 in the laminated area. This can ensure the flatness of the hydrogen flow path 153 formed in the Ni plate 152 accurately to a depth of 0.1 mm without unevenness.

Further, film magnetic layers 156a, 156b such as a pair of permanent magnets arranged in the longitudinal direction are fixed with an adhesive agent on the first metal plate 151 made of a stainless steel material 150. A pair of metal locating pins 157a, 157b are vertically provided in the vicinity of the film magnetic layers 156a, 156b. If a permanent magnet such as alnico magnet, ferrite magnet, rare-earth magnet (e.g., SmC0) is used for the film magnetic layers 156a, 156b, the thickness of the magnet can be reduced because it has a strong magnetic force, but such a permanent magnet is expensive. Therefore, a bond magnet such as a ferrite-bonded magnet, a plastic-bonded magnet, or a rubber-bonded magnet is used here.

The bond magnet is cheap and does not need exposing on the outer surface, so that the magnet can be used without breaking. The bond magnet can be bonded on the first metal plate 151 with epoxy resin. It is preferable to apply a rust-preventive or insulating coating over the surface of the bond magnet. Further, since the orientation of the north or south pole does not need selecting, there is no possibility of human operational error during assembly of the bond magnet.

Third Embodiment

Next, a third embodiment of the present invention will be described.

The third embodiment is directed to a fuel cell system including a plurality of fuel tanks and a plurality of fuel cell batteries.

Figure 14:
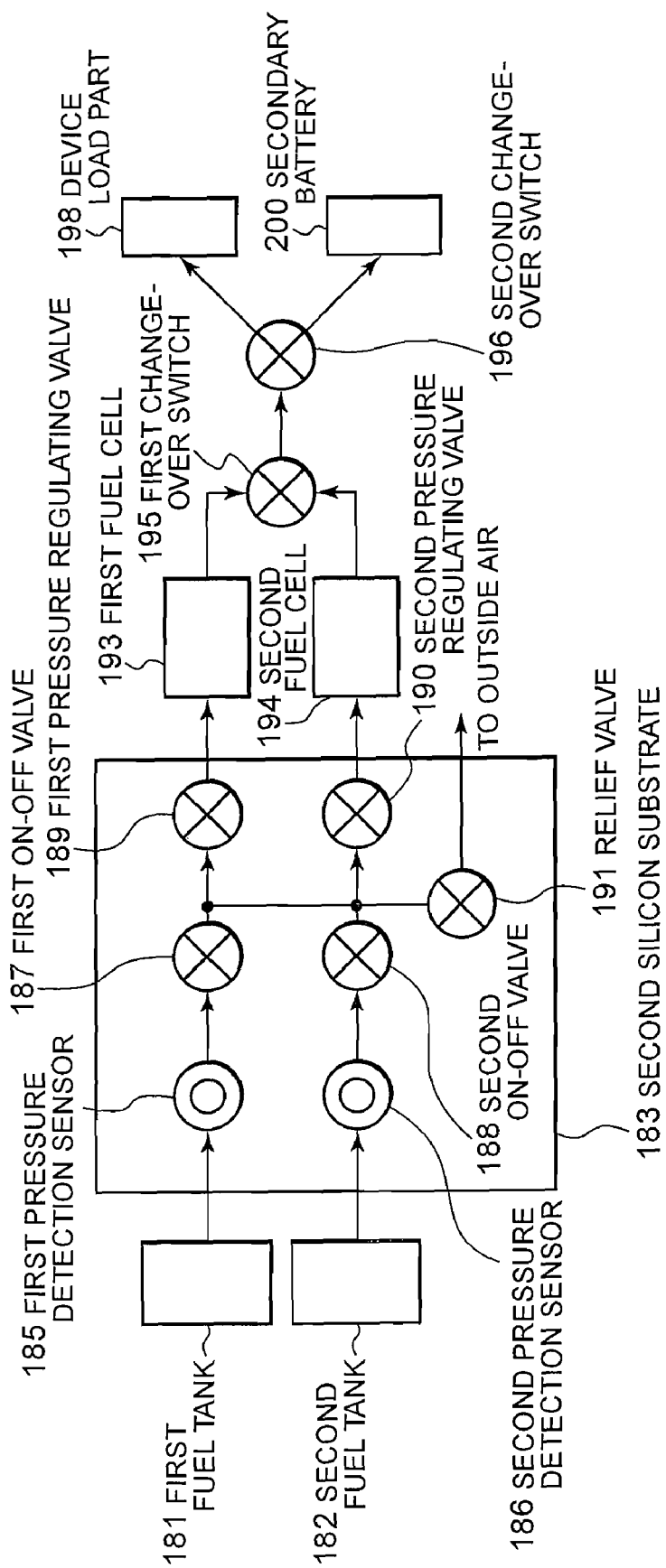
FIG. 14 is a block diagram showing the structure of a fuel cell system according to a third embodiment of the present invention.

FIG. 14 is a block diagram showing the structure of the fuel cell system according to the third embodiment of the present invention.

First and second pressure detection sensors 185, 186, respectively connected from first and second fuel tanks (hydrogen storage alloy container) 181, 182 different in hydrogen storage alloy through respective piping, not shown, and first and second on-off valves 187, 188 are arranged in parallel on a second silicon substrate 183, respectively. Then, a relief valve 191 is arranged between the first and second on-off valves 187, 188 and outside air. Further, first and second pressure regulating valves 189, 190 are arranged between the first and second on-off valves 187, 188 and first and second fuel cells 193, 194, respectively.

First and second change-over switches 195, 196 are arranged in series between the first and second fuel cells 193, 194 and a device load part 198 and a secondary battery 200, respectively.

The operation of the first and second fuel cells 193, 194 and the first and second change-over switches 195, 196 is as follows.

A selection between the first fuel cell 193 and the second fuel cell 194 can be made to change the battery use conditions of a device load part 198 such as to limit the number of shots or the recording time of a moving image during shooting, or to limit the time of a slide show during playback.

As another specific example, in case of use of a disk camcoder for recording data of moving image or still image shots in an user area on a disk recording medium made of a perpendicular magnetic film recording material or a phase-change recording material, the disk camcoder can include any one of a temperature detection part for detecting temperature from a semiconductor laser of a head incorporated in a disk unit, a temperature sensor incorporated in an access mechanism driving system for causing the head to do seeks in the radial direction, or a temperature sensor arranged in the vicinity of the disk recording medium. In this case, the second change-over switch is arranged between the first and second fuel cells 193, 194 and the device load part 198 and the secondary battery 200 (note that the first change-over switch for selecting between the first fuel cell 193 and the second fuel cell 194 is not provided).

A fuel cell unit having first and second fuel cells is composed of the fuel cells and a package containing a pair of fuel tanks (hydrogen storage alloy containers) for supplying fuel, where a cooling element having an area smaller than that of the rear face of the fuel tank is arranged in the vicinity of the fuel tank. Then, in an imaging apparatus as the device load part, an image pickup device controls the cooling element to operate upon start of imaging of a subject.

Alternatively, in a device load part including a temperature sensor for measuring the surface temperature of an IC chip for a lens drive circuit, a control circuit controls the operation of the pair of fuel cells according to the measurement results of the temperature sensor. When the surface temperature of the IC chip for the lens drive circuit reaches a predetermined value, this control circuit starts supply of electric power to the cooling element or reduces the amount of electric power to the fuel cell.

Further, when the device load part is in operation, the control circuit can also control the cooling element to cool the fuel cell during a period from the start of the imaging operation until a still image signal is transferred from the image pickup device to the disk unit. In such a case, this fuel cell system is configured such that the imaging apparatus is driven by the first fuel cell and the disk unit and a buffer memory are driven by the second fuel cell. Then, the first and second fuel cells are operated continuously and simultaneously.

During this operation, when the residual capacity of the first fuel tank connected to the first fuel cell reaches a limit value for driving the imaging apparatus, switching is performed to cause the second fuel cell to drive the imaging apparatus, the disk unit, and the buffer memory.

On the other hand, when the residual capacity of the second fuel tank connected to the second fuel cell reaches a limit value for driving the disk unit and the buffer memory, switching is performed to cause the first fuel cell to drive the imaging apparatus, the disk unit, and the buffer memory.

Therefore, when a user uses the imaging apparatus, a warning indication is provided on a display device (LCD) so that the user can check the status of the first and second fuel cells (both fuel cells in use, or any one of the fuel cells in use). Alternatively, a light-emitting diode (LED) can be lit up, and an alarm tone or a warning message can be sounded. A CPU senses a pressure sensor in the microscopic fluid flow path using a temperature sensor or the like arranged in the vicinity of a disk in the disk unit, so that the first and second fuel cells can be operated to drive the imaging apparatus without stopping the disk unit.

With the warning indication of the residual battery capacity, there is a problem that the available time for the display itself under a low-temperature environment is shorter than under the normal temperature environment. For this reason, the temperature sensor for detecting temperature is provided to be exposed on the exterior package of the device load part. Then, respective on-off valves are opened to operate the first and second fuel cells only when the detected temperature is a predetermined low temperature, thus making it possible to supply electric power from the two fuel cells to each driver circuit in the device load part. This structure can prevent the detection of an underestimated fuel residual capacity due to a low temperature.

Therefore, the user can keep the shooting mode even under a low temperature environment without causing malfunction of the control circuit in the device load part. Further, when flash light is emitted from a flash device in the shooting mode, although the voltage load change increases, this fuel cell battery can respond to the increase in voltage load change because it uses hydrogen gas as fuel and has higher power generation efficiency than a fuel cell battery using methanol as fuel.

The temperature sensor can also be used as a temperature detection sensor for correcting the temperature of a camera module unit. In this case, since the number of members in the device load part can be reduced, the device load part of the embodiment can be manufactured at low cost.

As another specific example of the device load part, there is a cradle for noncontact charging (for example, disclosed in Japanese Patent Application Laid-Open No. 2006-203997). Here, as the power source for the cradle of the noncontact charging type, two different types of fuel cell batteries can be used, where a sensor for sensing the weight or outer shape of the device load part and a primary coil are provided.

Upon placing a device load part (e.g., electronic camera) on the cradle, the device load part is installed on a noncontact charging unit, not shown, provided in the cradle to charge a secondary battery incorporated in the device load part. The noncontact charging unit in the cradle incorporates therein a primary coil and two different types of fuel cell batteries for energizing this primary coil with direct current.

Further, a single fuel cell battery as a power source for supplying power to a backlight for timer display used for setting an alarm clock or charge time can be incorporated in the cradle in combination with a single fuel cell battery for energizing the primary coil with direct current. The device load part incorporates therein a secondary coil electromagnetically coupled to the primary coil of the noncontact charging unit and a charge control circuit for controlling the charging state of the secondary battery. When the device load part is installed on the noncontact charging unit of the cradle, a direct current is induced in the secondary coil incorporated in the device load part, so that the secondary battery incorporated in the device load part can be charged under the control of the charge control circuit.

Further, instead of providing the timer display for setting the charge time, the control circuit can include a protection circuit for switching a switching element from on to off when the secondary battery is fully charged.

Further, communication means can be provided between the cradle and the device load part in such a manner that when the residual capacity of the first fuel cell battery is equal to or less than a predetermined value on condition that the first fuel cell battery is connected to the secondary battery of the device load part, the control circuit disconnects the fuel cell battery from the secondary battery to stop the supply of power to the secondary battery, and sends a signal to the secondary battery of the device load part through the communication means to request the start of supply from the second fuel cell battery in the cradle so as to enable the supply of power to the secondary battery of the device load part.

The above-mentioned second change-over switch is provided to switch the residual capacity of the fuel cell battery from the device load part to the secondary battery when the fuel tank becomes a high-temperature/high-pressure state. In the high-temperature/high-pressure state of this fuel tank, the output signal of the first or second pressure detection sensor is input to the CPU, and the CPU instructs a switch drive circuit, not shown, to actuate the second change-over switch. After power on is confirmed by the user, the CPU monitors the output signal of the first or second pressure detection sensor connected to the fuel tank (hydrogen storage alloy container) selected by the instruction from the CPU.

Then, when the output signal is equal to or less than a predetermined value, the CPU opens the first or second on-off valve to start control of the first or second pressure regulating valve. The hydrogen gas in the selected fuel tank flows from the first or second pressure regulating valve to the fuel cell. When a pressure value actually measured in the fluid flow path between this fuel tank and the pressure regulating valve is equal to or more than such a predetermined value that exceeds a pressure range the pressure regulating valve can accept, the relief valve is opened to let the hydrogen gas out into outside air, thereby enabling protection of the pressure regulating valve.

Although the two microscopic fluid flow paths connected from the plurality of fuel tanks to the respective fuel cells are described above, this structure can also be such that a microscopic fluid flow path connects between a single fuel tank and a single fuel cell. In this case, the first change-over switch can be omitted, enabling a fuel cell system structure having a simplified microscopic fluid flow path.

Further, an acceleration sensor can be formed by attaching a spindle to a diaphragm-shaped fluid front of the pressure detection sensor and joining a piezoresistors and a capacitance element on the diaphragm surface. In this case, the control circuit can monitor the output signal of this acceleration sensor to change the residual capacity indicator to an error indicator when an error occurs due to the influence of external vibration.

According to the aforementioned embodiments, when a an error occurs due to an abrupt temperature rise in electronic equipment (e.g., in the vicinity of an image pickup device or an optical disk), the control circuit (CPU) disconnects the fuel cell from the device load part based on the output signal from the thermistor temperature sensor in the vicinity of the optical disk, thereby enabling reduction of battery consumption. At this time, the battery capacity indicator displayed on the display part of the electronic equipment can also be stopped.

The following describes a printer dock.

The device load part (hereinafter referred to as "digital camera") and a printer is directly connected. The digital camera includes transfer means for transferring image information to the printer, and receiving means for receiving print complete information sent from the printer. In a print system in which a first fuel cell battery is placed in the digital camera and a second fuel cell battery is placed in the printer (with a cradle), control is performed (on condition that data including a PCT coefficient specific to the printer is stored in a ROM like in the electronic camera mentioned above) based on output of a temperature detection part including a temperature sensor arranged in the outer surface of the printer or in a printer engine (e.g., in a neighboring portion of a head) to supply electric power from the second fuel cell battery arranged in the printer to a secondary battery of the digital camera. Then, image data is automatically printed without worry about the residual capacity of the secondary battery being insufficient when the digital camera is in use. This structure can transfer and print image data on the printer reliably without letting the user aware of anything.

The aforementioned embodiments describe the structure in which the glass substrate and the silicon substrate as a semiconductor substrate are joined together. However, the glass substrate can be replaced with a semiconductor substrate to provide such a structure that the semiconductor substrates are joined together.

According to the embodiments of the present invention, the following structures can be obtained.

(1) Electronic equipment using fuel cell batteries, which has such a residual capacity indicator to indicate the residual capacity indicator and/or available time of each of first and second fuel cell batteries while changing the display color depending on the type of fuel cell battery. This structure can provide a more user-friendly display.

(2) A electronic equipment system using a fuel cell battery and including an electronic camera loading device which has a print control circuit (CPU) and a residual capacity indicator for indicating the residual capacity of the fuel cell battery, in which the print control circuit (CPU) exchanges indicator disabling information with a control circuit of the electronic camera not to indicate the residual capacity of the fuel cell battery on a display device of the electronic camera. This structure can reduce power consumption due to the residual capacity indication.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A residual capacity detection method for a fuel cell battery connected to electronic equipment and having a fuel cell, a fuel storage container for supplying fuel to the fuel cell, and a flow path connecting between the fuel cell and the fuel storage container, the method comprising:
   detecting temperature at a predetermined portion of the electronic equipment connected to the fuel cell battery;
   detecting pressure in the flow path;
   reading a temperature difference between the temperature of the electronic equipment and a temperature of the flow path from prestored reference data;
   determining a temperature of the flow path based on the temperature difference read from the prestored reference data; and
   determining a residual capacity of the fuel cell battery from the determined temperature of the flow path and the detected pressure in the flow path.

2. The method according to claim 1, wherein the fuel cell battery to which the residual capacity detection method is applied includes
   a projection portion provided on a top face of the fuel cell to create a space for allowing air to pass through,
   a heat radiation member for radiating heat from the fuel cell, and
   a latent heat storage material residing between the fuel cell and the heat radiation member.

3. The method according to claim 1, wherein the electronic equipment connected to the fuel cell battery has at least a terminal for electric power output of the fuel cell and a terminal for pressure signal from the flow path.

4. The method according to claim 1, wherein the electronic equipment connected to the fuel cell battery has an error detection part for comparing the detected temperature output or the detected pressure with a predetermined temperature and pressure limit to detect an error in the fuel cell battery so as to disconnect the fuel cell battery from a device load part.

5. The method according to claim 1, wherein upon detecting temperature at a predetermined portion of the electronic equipment connected to the fuel cell battery, one of temperatures detected in a plurality of temperature detection portions in the electronic equipment is selected.

6. The method according to claim 5, wherein the temperature detection portions in the electronic equipment include at least one of a portion exposed on the electronic equipment, a portion in a fuel cell compartment, a portion in an IC chip for a lens drive circuit or in the vicinity of a lens drive circuit substrate, a portion in the vicinity of a secondary battery, a portion in the vicinity of a disk medium, and a portion in the vicinity of an image pickup device.

* * * * *